(12) United States Patent
Rea et al.

(10) Patent No.: US 12,348,849 B1
(45) Date of Patent: Jul. 1, 2025

(54) STABALIZED ELECTRICAL MANHOLE INSPECTION TOOL

(71) Applicant: VAULTSCAN360, LLC, Mesa, AZ (US)

(72) Inventors: James Rea, Mesa, AZ (US); Steve Winden, Mesa, AZ (US)

(73) Assignee: VAULTSCAN360, LLC, Mesa, AZ (US)

( * ) Notice: Subject to any disclaimer, the term of this patent is extended or adjusted under 35 U.S.C. 154(b) by 186 days.

(21) Appl. No.: 18/344,005

(22) Filed: Jun. 29, 2023

(51) Int. Cl.
| | |
|---|---|
| H04N 23/50 | (2023.01) |
| F16M 11/20 | (2006.01) |
| F16M 11/24 | (2006.01) |
| F16M 13/02 | (2006.01) |
| G03B 15/05 | (2021.01) |
| G03B 17/56 | (2021.01) |
| H04N 23/54 | (2023.01) |
| H04N 23/56 | (2023.01) |
| H04N 23/66 | (2023.01) |
| H04N 23/695 | (2023.01) |

(52) U.S. Cl.
CPC ....... *H04N 23/555* (2023.01); *F16M 11/2078* (2013.01); *F16M 11/24* (2013.01); *F16M 13/022* (2013.01); *G03B 15/05* (2013.01); *G03B 17/561* (2013.01); *H04N 23/54* (2023.01); *H04N 23/56* (2023.01); *H04N 23/66* (2023.01); *H04N 23/695* (2023.01); *G03B 2215/0514* (2013.01); *G03B 2215/0557* (2013.01); *G03B 2215/0567* (2013.01)

(58) Field of Classification Search
None
See application file for complete search history.

(56) References Cited

U.S. PATENT DOCUMENTS

| | | |
|---|---|---|
| 3,764,736 A | 10/1973 | Kosky et al. |
| 4,281,343 A | 7/1981 | Monteiro |
| 4,504,857 A | 3/1985 | Miller et al. |
| 4,643,867 A | 2/1987 | Horsak et al. |
| 4,855,820 A | 8/1989 | Barbour |
| 5,123,492 A | 6/1992 | Lizanec, Jr. |
| 5,140,319 A | 8/1992 | Riordan |
| 5,275,038 A | 1/1994 | Sizer et al. |
| 5,287,740 A | 2/1994 | Tonita |
| 5,350,033 A | 9/1994 | Kraft |
| 5,652,616 A | 7/1997 | Barbour |
| 5,790,185 A | 8/1998 | Auzerais et al. |
| 5,903,306 A | 5/1999 | Heckendorn et al. |
| 6,041,860 A | 3/2000 | Nazzal et al. |

(Continued)

FOREIGN PATENT DOCUMENTS

| | | | | |
|---|---|---|---|---|
| CN | 104266083 A | * | 1/2015 | |
| CN | 107102006 A | * | 8/2017 | |
| EP | 2669649 A2 | * | 12/2013 | ............ G01M 3/005 |

*Primary Examiner* — Rodney E Fuller
(74) *Attorney, Agent, or Firm* — Dietz Law Office LLC

(57) ABSTRACT

A stable inspection tool and method for inspecting electrical manhole vaults and other structures. The tool and method of the present invention eliminates the need for physical entry into underground electrical manhole vaults and other underground structures when inspecting the structure or when identifying, tracing and mapping existing conductor and conduit locations. Further, improved images of the structure may be obtained without entering the structure.

18 Claims, 30 Drawing Sheets

(56) References Cited

U.S. PATENT DOCUMENTS

| | | | |
|---|---|---|---|
| D440,589 S | 4/2001 | Bernacki et al. | |
| 7,187,784 B2 | 3/2007 | Tawfig et al. | |
| 8,054,459 B2 | 11/2011 | Lindner | |
| 9,521,373 B2 | 12/2016 | Lynch | |
| 9,733,549 B2 | 8/2017 | Drost et al. | |
| 9,746,429 B2 | 8/2017 | Zino et al. | |
| 10,196,867 B2 | 2/2019 | Mailly et al. | |
| 10,295,888 B2 | 5/2019 | Brunt | |
| 10,795,237 B2 | 10/2020 | Lindner | |
| 11,153,554 B2 | 10/2021 | Firmin et al. | |
| 11,446,831 B1* | 9/2022 | Magdaleno | B25J 9/048 |
| 2007/0109403 A1* | 5/2007 | Lortie | E03F 7/12 |
| | | | 348/E7.087 |
| 2010/0059219 A1 | 3/2010 | Roberts et al. | |
| 2010/0155549 A1 | 6/2010 | Robinson | |
| 2013/0275100 A1 | 10/2013 | Ellis et al. | |
| 2016/0191847 A1 | 6/2016 | Harris et al. | |
| 2017/0314369 A1 | 11/2017 | Rosano et al. | |
| 2018/0324335 A1* | 11/2018 | Hubbard | G03B 17/561 |
| 2020/0055196 A1 | 2/2020 | Halpenny et al. | |
| 2020/0224525 A1 | 7/2020 | Parmeshwar et al. | |
| 2021/0222539 A1 | 7/2021 | Kroczka et al. | |
| 2021/0302809 A1 | 9/2021 | Leffingwell | |

* cited by examiner

STABALIZED ELECTRICAL MANHOLE INSPECTION TOOL

CROSS-REFERENCE TO RELATED APPLICATIONS

Not Applicable.

FEDERALLY SPONSORED RESEARCH AND DEVELOPMENT

Not Applicable.

JOINT RESEARCH AGREEMENT

Not Applicable.

TECHNICAL FIELD

This invention pertains generally to inspection tools for inspecting conduits, containment structures, and other areas that are difficult to visually inspect. More specifically, this invention pertains to a finitely controllable inspection tool and method for inspecting a structure, such as an electrical manhole vaults or other difficult to access structures. For ease of description and without limitation intended, the invention will be described in relation to use as an inspection tool of underground electrical vault structures. The tool and method of the present invention eliminates the need for physical entry and exposure to underground electrical manhole vaults when inspecting the structure. The inspection tool of the present invention further facilitates safe imaging, identification, tracing, and mapping of existing electrical conductors and conduit locations within the structure.

BACKGROUND

Over the years there has been a need to inspect structures, such as underground utility manholes and electrical vaults. At times, the access point to these underground structures may be in the middle of a roadway, along the side of a road, or even under an existing sidewalk. In order to access these structures, in the past, municipal permits and multi person crews were often required to safely control traffic over an extended period of time near the access point. The amount of time and resources to inspect these structures has led to delays and substantial increases in inspection costs. By way of example, previously, at least three journeymen linemen and one helper (each spending a minimum of two hours), together with two trucks, multiple barricades, rescue tripod, blower and detailed municipal planning and permitting have been required in order to inspect an electrical vault with an access point in a roadway. In addition to the substantial inspection costs, physical entry into the structure may subject crew members to toxic gas or other air quality issues, falling/tripping hazards, and potential electrical contact hazards. Thus, a need exists for a simple, stable, mobile inspection tool and method that reduces the time required to inspect underground structures without requiring physical entry into the structure. Those skilled in the art will recognize and appreciate that the inspection tool of the present invention may also be used to inspect difficult to observe above ground structures such as tankers, building ventilation, cargo containers, fuel tanks, or water systems, to name just a few.

SUMMARY

Embodiments according to aspects of the invention provide an inspection tool system and method for inspecting structures that reduces the amount of time required for safe inspection of the structure. The apparatus and system of the present invention further provides for remotely capturing images from various heights, angles, and 360 degrees of view within the structure. The inspection tool of the present invention is particularly useful for precise identification, tracing and mapping of existing conductor and conduit locations within an underground structure. Certain embodiments of the present invention include a platform, an extendable pole, a mounting bracket, a camera, and a light emitting source. The platform is capable of centering over an access point to an underground structure such that a central opening extending through the platform aligns with the access point. The mounting bracket couples to the platform in alignment with the central opening, wherein the mounting bracket is adapted for coupling the extendable pole to the platform. The camera has a camera mount that engages the camera to an end of the extendable pole. The camera also has a link to transmit and receive signals to and from a receiver positioned near a base or access point of the structure. Additionally, the camera mount includes servo motors such that the servo motors rotate the camera in at least one of a vertical, horizontal and circular orientation relative to a longitudinal axis of the extendable pole and the servo motors are linked to the receiver to transmit and receive servo control signals to and from the receiver. The light emitting sources are coupled to the extendable pole proximate the camera wherein the light emitting sources emit light to illuminate 360 degrees about the extendable pole.

Embodiments in accordance with this aspect of the invention may include a mounting bracket having an angle alignment member that is adapted to engage and disengage with the extendable pole. Also, the apparatus may further include a wire having one end coupled to the platform and another end of the wire coupled to an electrical ground. The platform may be supported by length adjustable legs or supported on opposing sides of the platform by extendable slides. Further, the extendable pole may include a ball fixed about the extendable pole such that the ball is adapted for coupling with a ball clamp of the mounting bracket so that the extendable pole may be pivoted and swiveled about the mount in controlled increments. In this embodiment the mounting bracket may also include a plate having ball receiving receptacle. The plate has tabs to fix the ball clamp to the plate.

In accordance with certain aspects of the invention, an embodiment of the invention includes a method of inspecting underground structures, such as an electrical vault, that increases safety and reduces the amount of time and effort to inspect the structure. The method includes the steps of obtaining an inspection apparatus (wherein the apparatus has a platform, an extendable pole, a mounting bracket, a camera, and a light emitting source); centering the apparatus platform over an access point of the structure to be inspected; positioning the apparatus extendable pole within the central opening of the platform and coupling the extendable pole to the apparatus mounting bracket; engaging a height adjustment collar to the extendable pole; engaging the camera to the extendable pole with a camera mount; lowering the camera through the access point of the structure until the height adjustment collar engages the mounting bracket; providing electrical power to the camera and light emitting sources; controlling the servo motors to adjust the camera orientation within the access point; and transmitting data between the camera and receiver.

The inspection tool utilized by the method may further include a platform capable of centering over an access point to the structure wherein the platform is supported by extendable legs or slides affixed to a mobile vehicle. The mounting bracket may couple to the platform in alignment with the central opening, wherein the mounting bracket is adapted for coupling the extendable pole to the platform. Without limitation intended, the camera affixed to the extendable pole may be of a LIDAR, thermal (infrared), standard Bluetooth digital color type camera, or other known camera suitable for use with the inspection tool and method of the present invention. The camera may have a camera mount that engages the camera to an end of the extendable pole. Electronically, the camera may further have a link to transmit and receive signals to and from a receiver positioned near the access point of the structure, and further the camera or camera mount may include servo motors such that the servo motors rotate the camera in at least one of a vertical, horizontal and circular orientation relative to a longitudinal axis of the extendable pole. Additionally, the servo motors may be linked to the receiver to transmit and receive servo control signals to and from the receiver. Also, light emitting sources may be coupled to the extendable pole proximate the camera wherein the light emitting sources emit light to illuminate 360 degrees about the extendable pole.

In accordance with certain embodiments of the invention the method may further include the step of mounting extendable slides to opposing sides of the platform. Additionally, the method may include the step of attaching the extendable slides to a transport vehicle. Also, the method may include the step of transporting the inspection tool utilizing a hand truck of the type described in U.S. Pat. No. 11,305,802B2.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The underground inspection tool 10 of the present invention provides an apparatus and method to quickly and safely inspect, image, map, identify, and trace existing underground electrical conductors contained within underground electrical vaults. Those skilled in the art will recognize that the inspection tool of the present invention may be equally useful for inspection, observation or monitoring other structures whether above or below ground that pose challenges to simply visually inspect. For purposes of discussion, and by way of example without limitation intended, an underground vault 14 having a plurality of electrical conduits 16 will be described with reference to the inspection tool 10 and use of the inspection tool.

Figure 1:
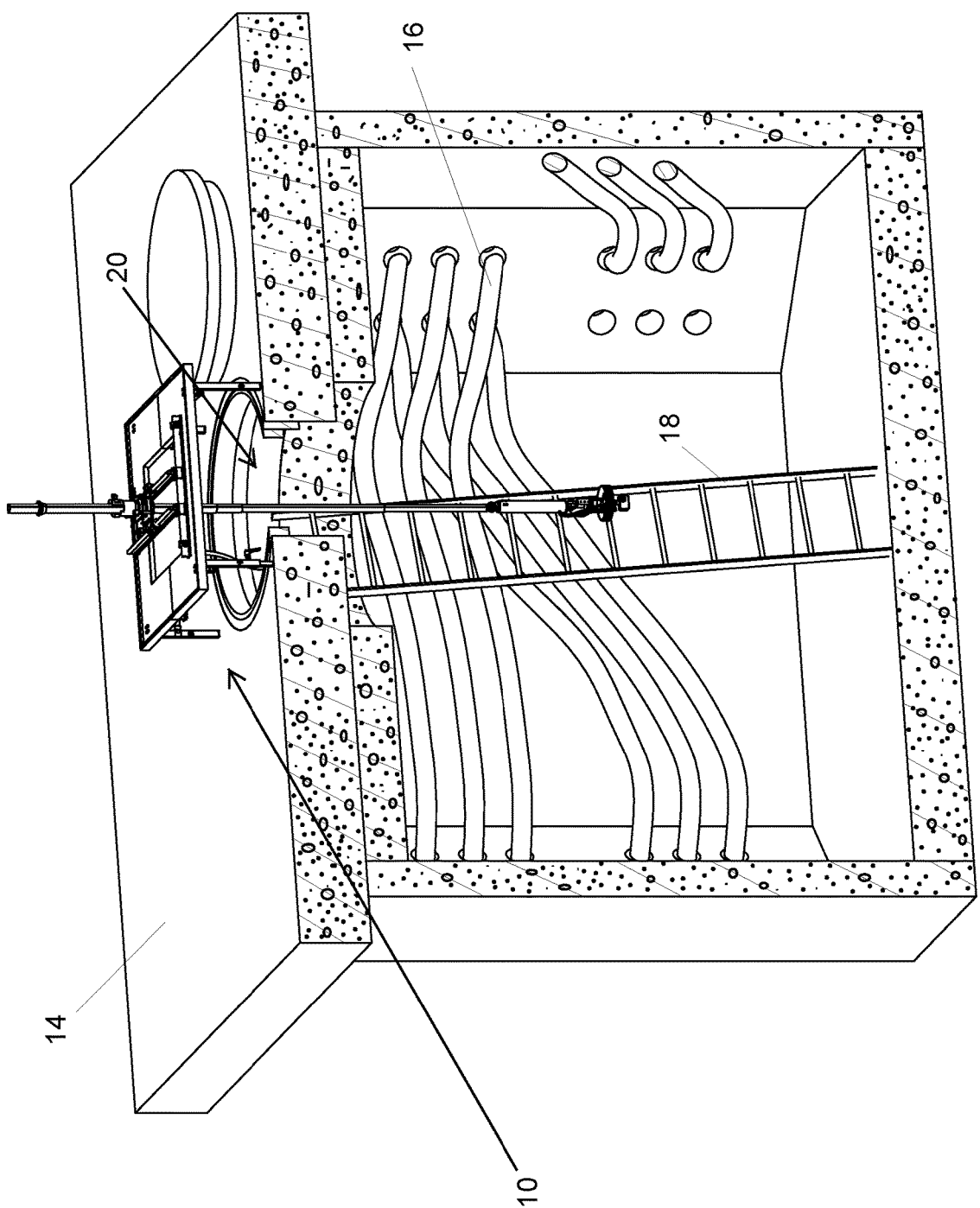
FIG. 1 is a partial sectional top perspective view of a stabilized electrical manhole inspection tool in accordance with aspects of the present invention aligned over the access point of an electrical vault.
Figure 2:
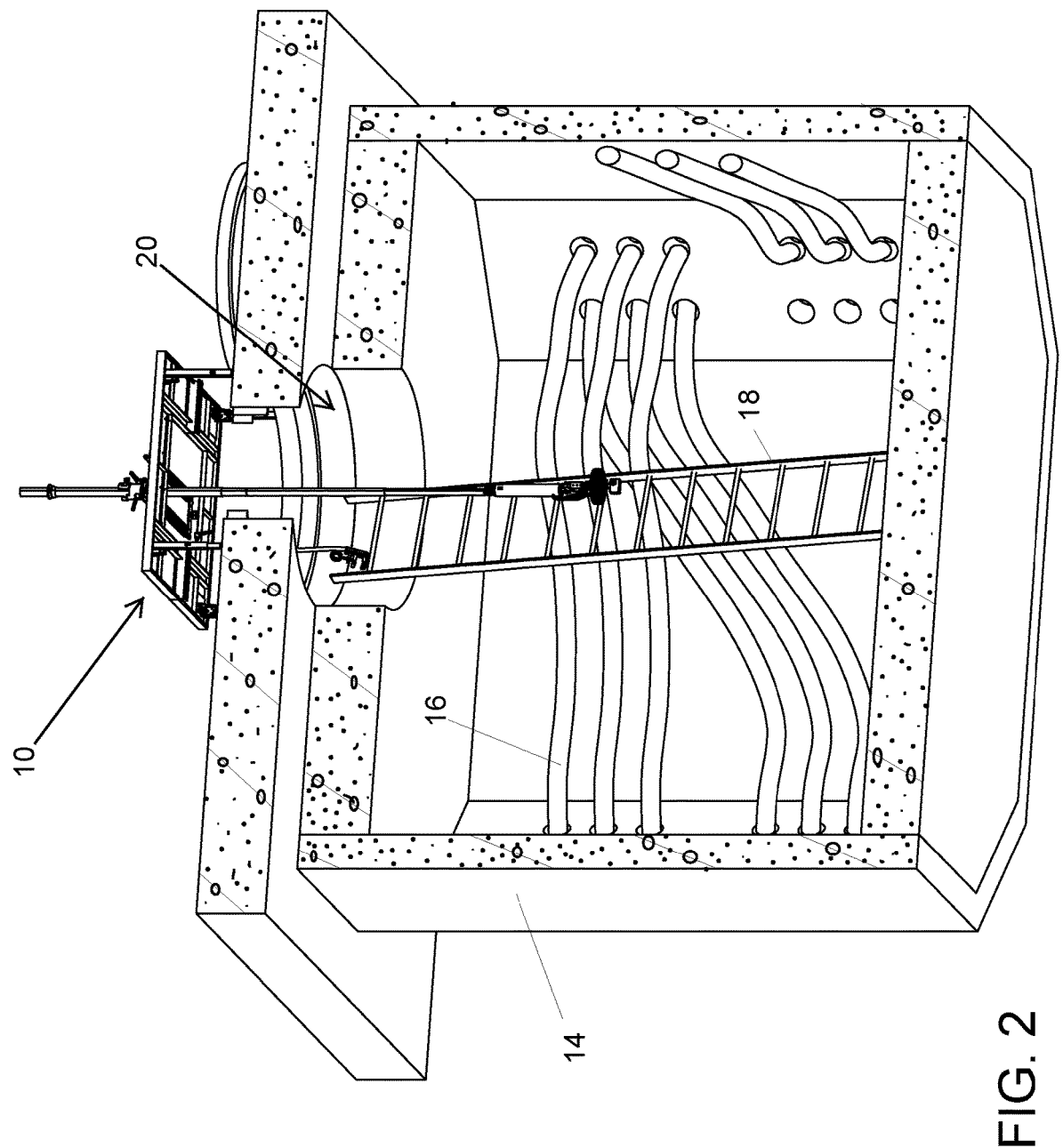
FIG. 2 is a partial sectional bottom perspective view of a stabilized electrical manhole inspection tool in accordance with aspects of the present invention aligned over the access point of an electrical vault.
Figure 3:
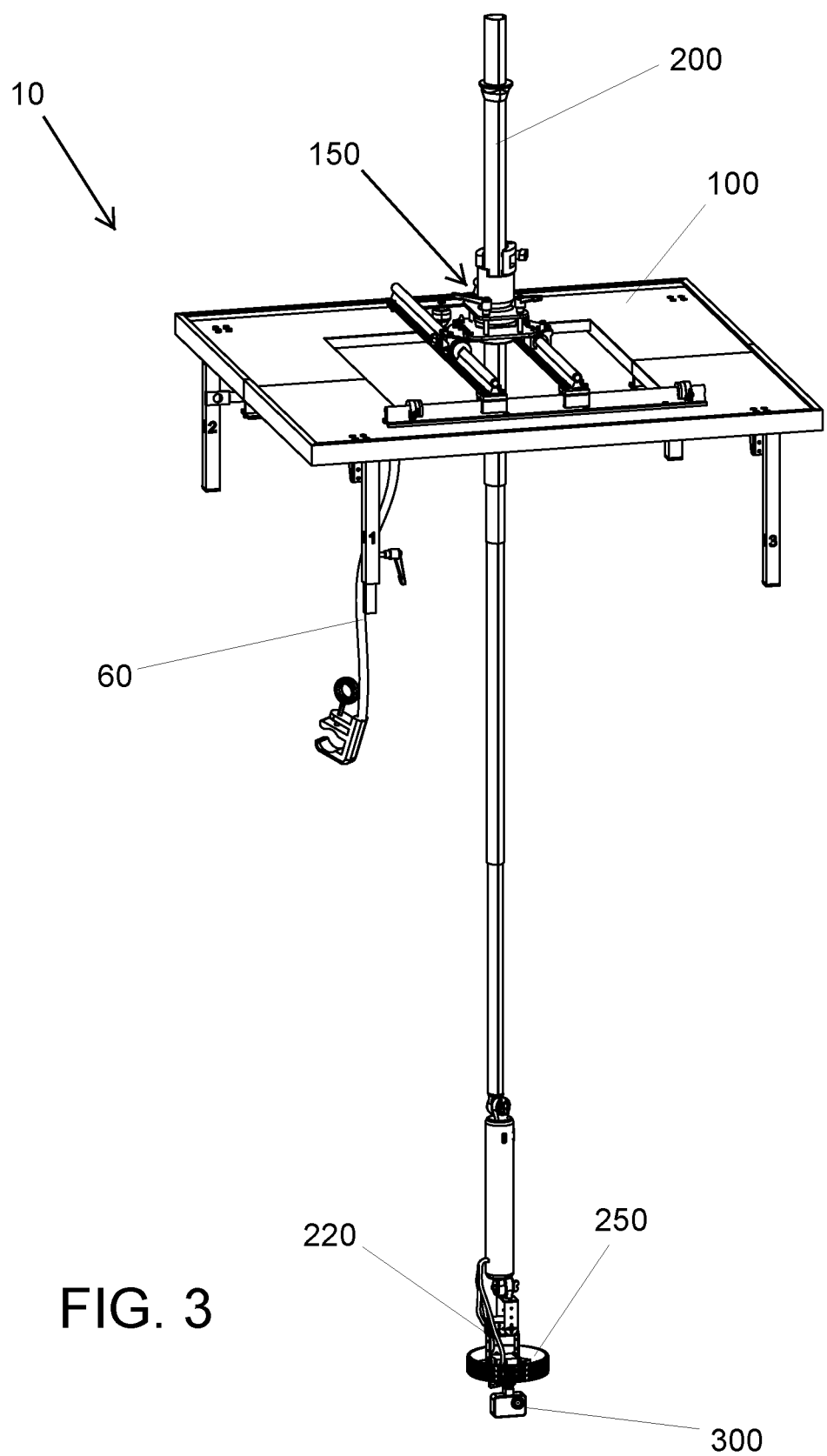
FIG. 3 is a top front perspective view of a stabilized electrical manhole inspection tool in accordance with aspects of the present invention.
Figure 4:
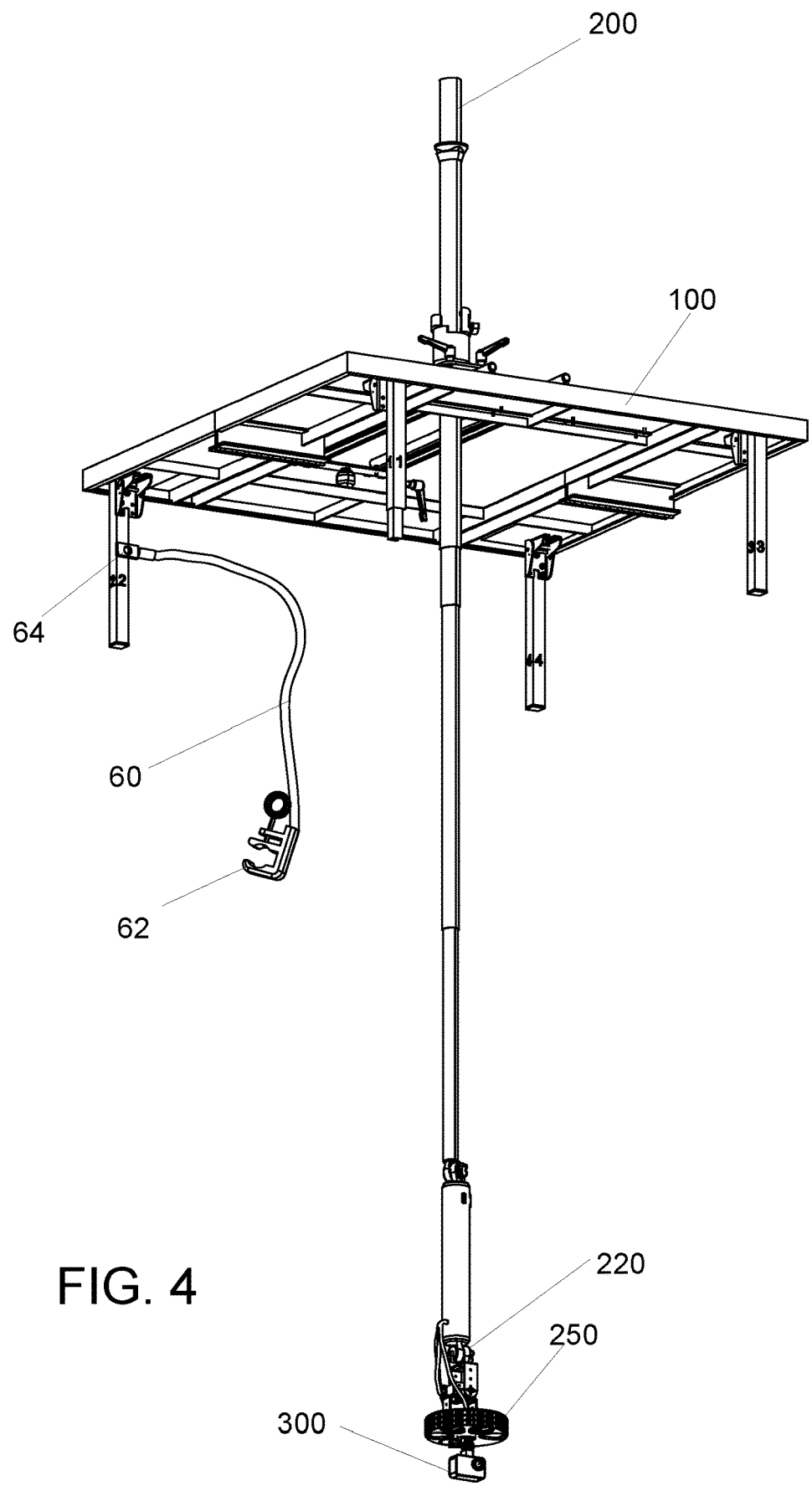
FIG. 4 is a bottom front perspective view of a stabilized electrical manhole inspection tool in accordance with aspects of the present invention.
Figure 5:
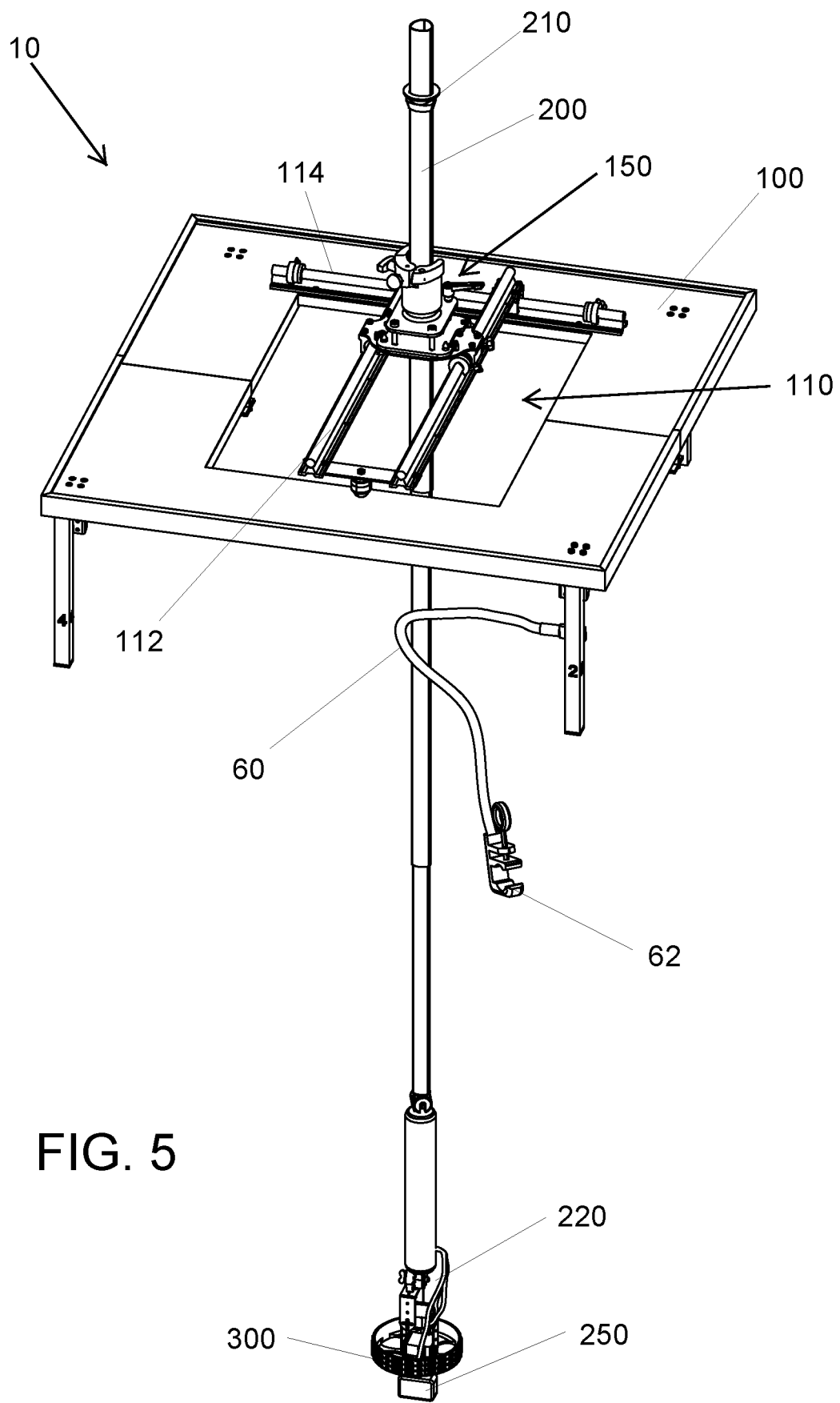
FIG. 5 is a top back perspective view of a stabilized electrical manhole inspection tool in accordance with aspects of the present invention.
Figure 6:
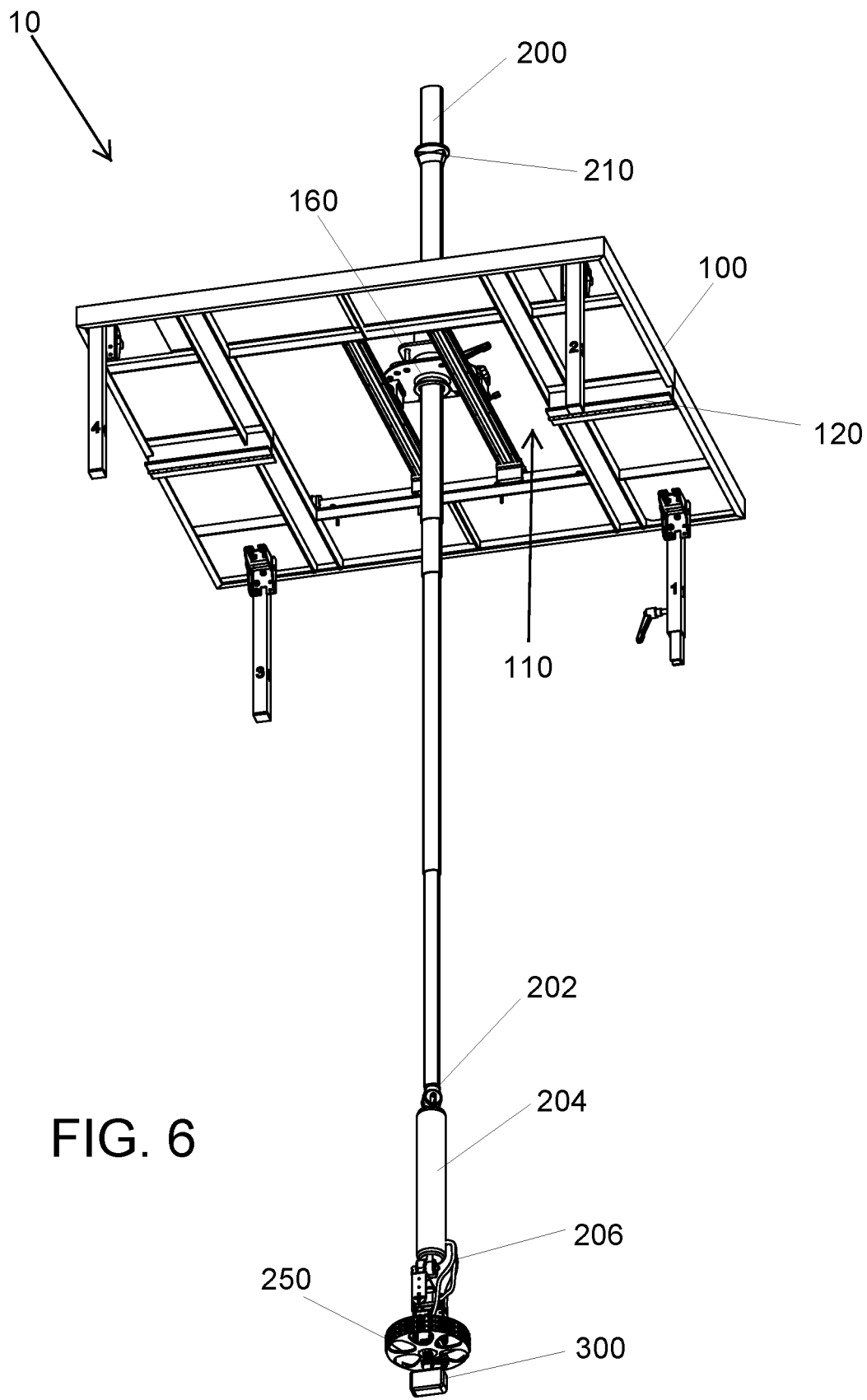
FIG. 6 is a bottom back perspective view of a stabilized electrical manhole inspection tool in accordance with aspects of the present invention.
Figure 7:
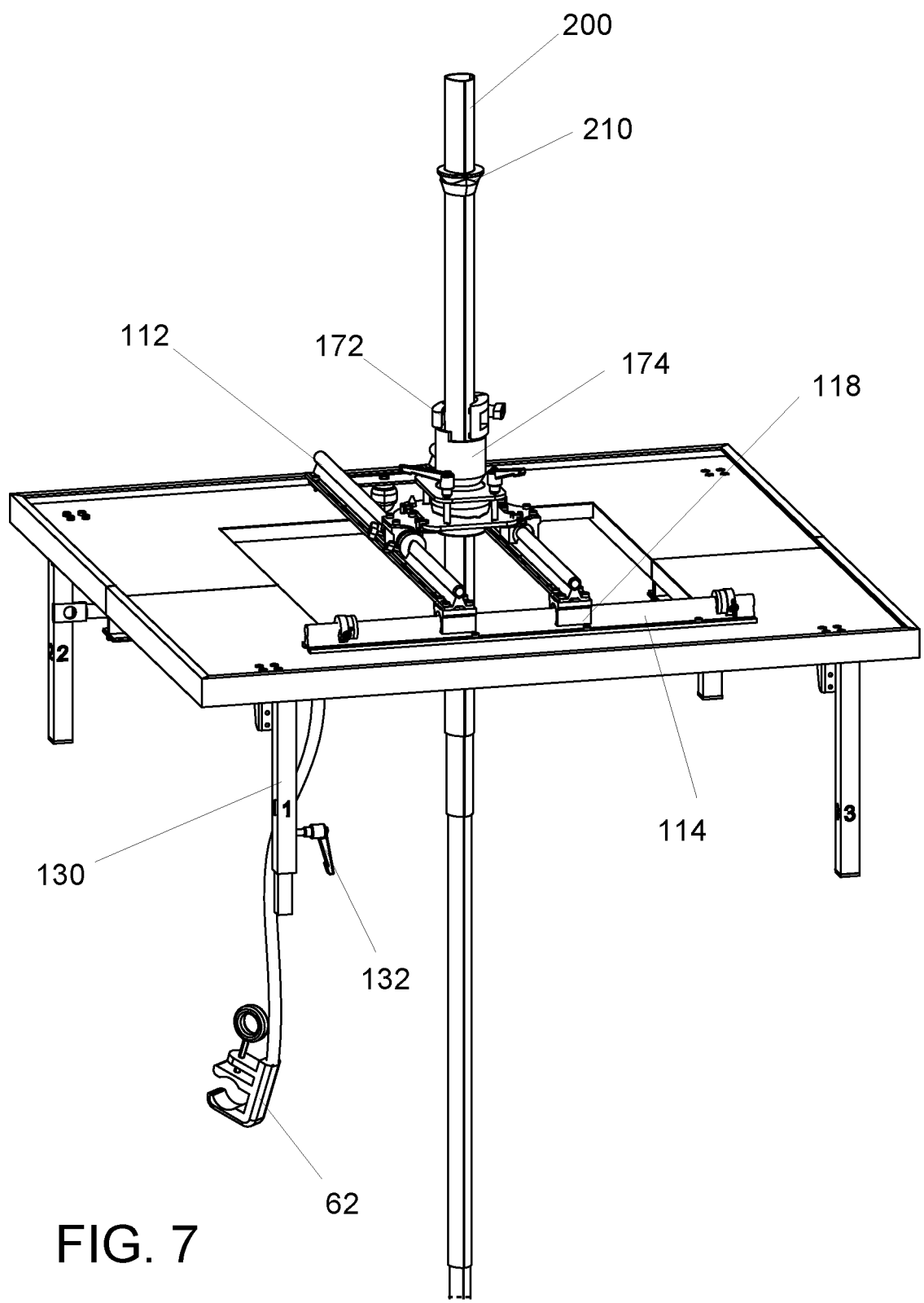
FIG. 7 is a partial sectional top front perspective view of a stabilized electrical manhole inspection tool shown with the extendable pole coupled to the mount of the platform in accordance with aspects of the present invention.
Figure 8:
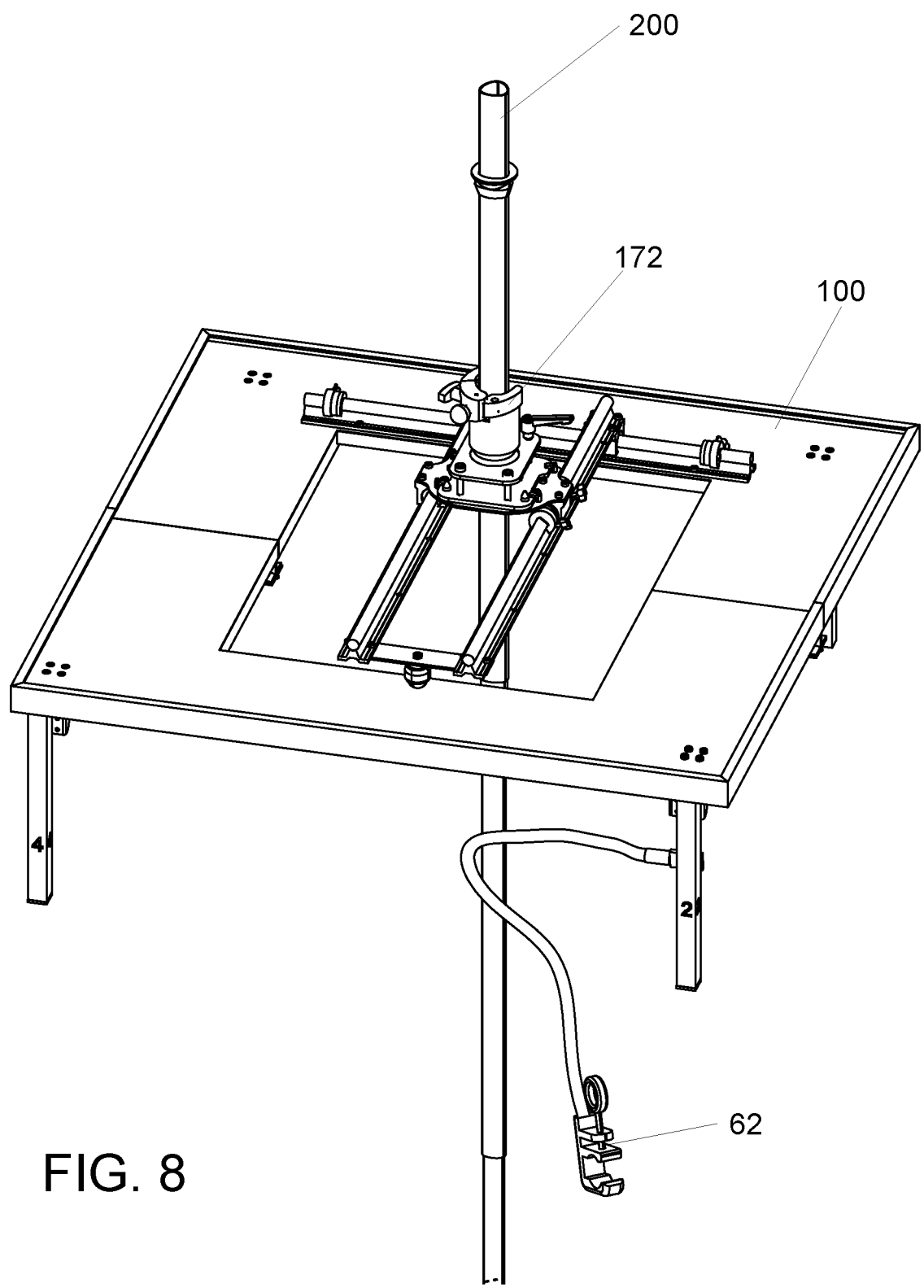
FIG. 8 is a partial sectional top back perspective view of a stabilized electrical manhole inspection tool shown with the extendable pole coupled to the mount of the platform in accordance with aspects of the present invention.
Figure 9:
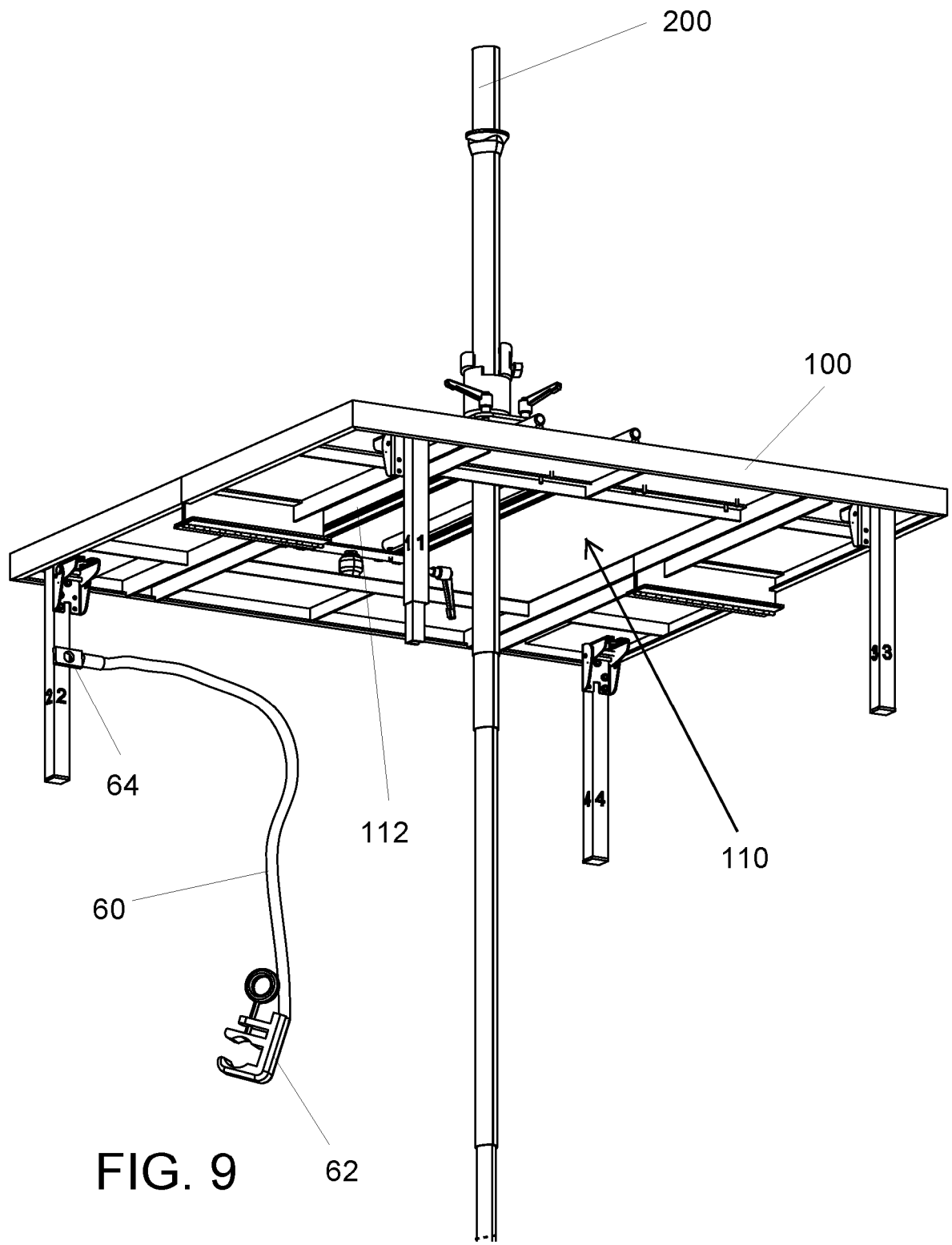
FIG. 9 is a partial sectional top back perspective view of a stabilized electrical manhole inspection tool shown with the extendable pole coupled to the mount of the platform in accordance with aspects of the present invention.
Figure 10:
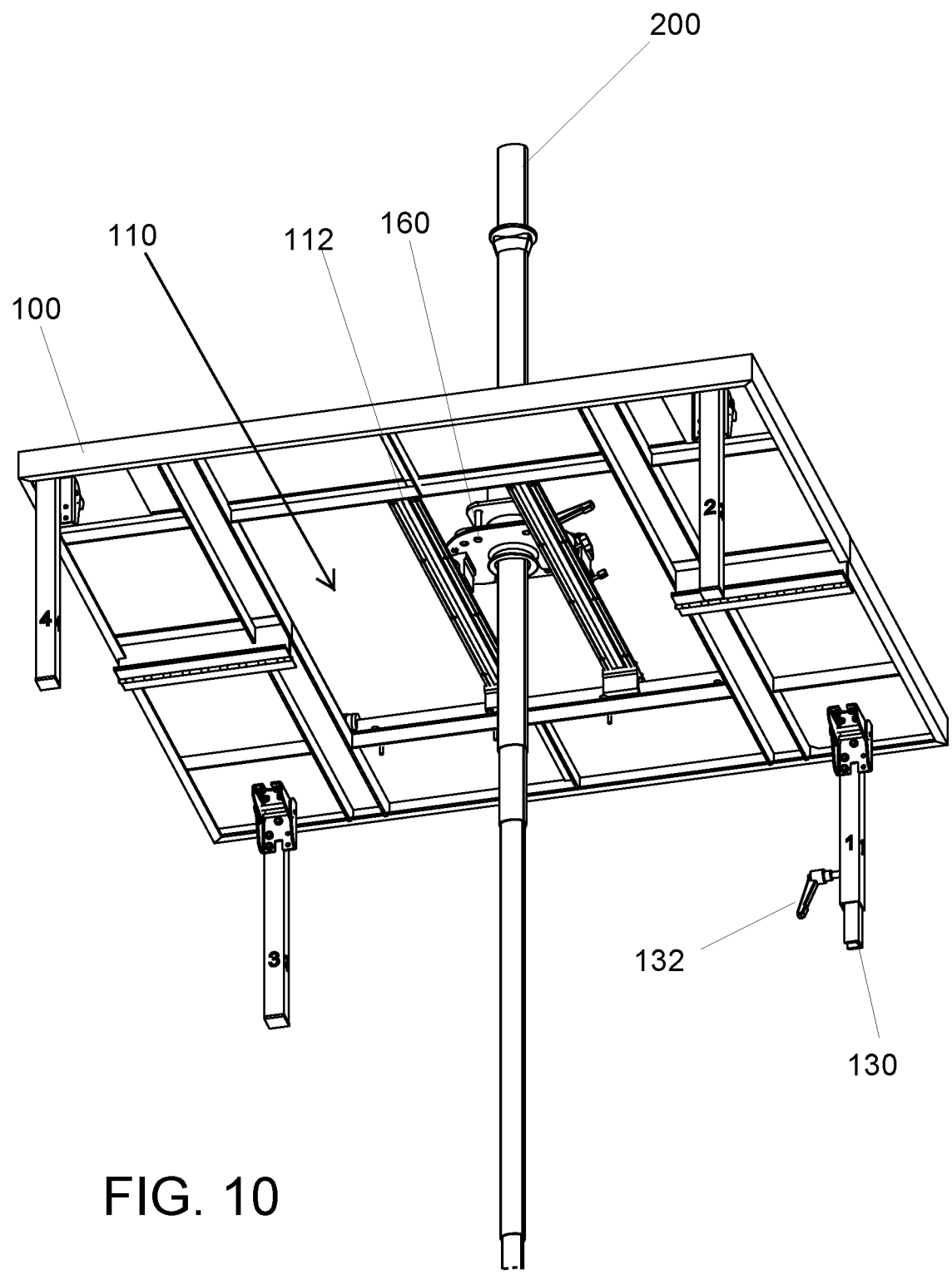
FIG. 10 is a partial sectional bottom back perspective view of a stabilized electrical manhole inspection tool shown with the extendable pole coupled to the mount of the platform in accordance with aspects of the present invention.
Figure 11:
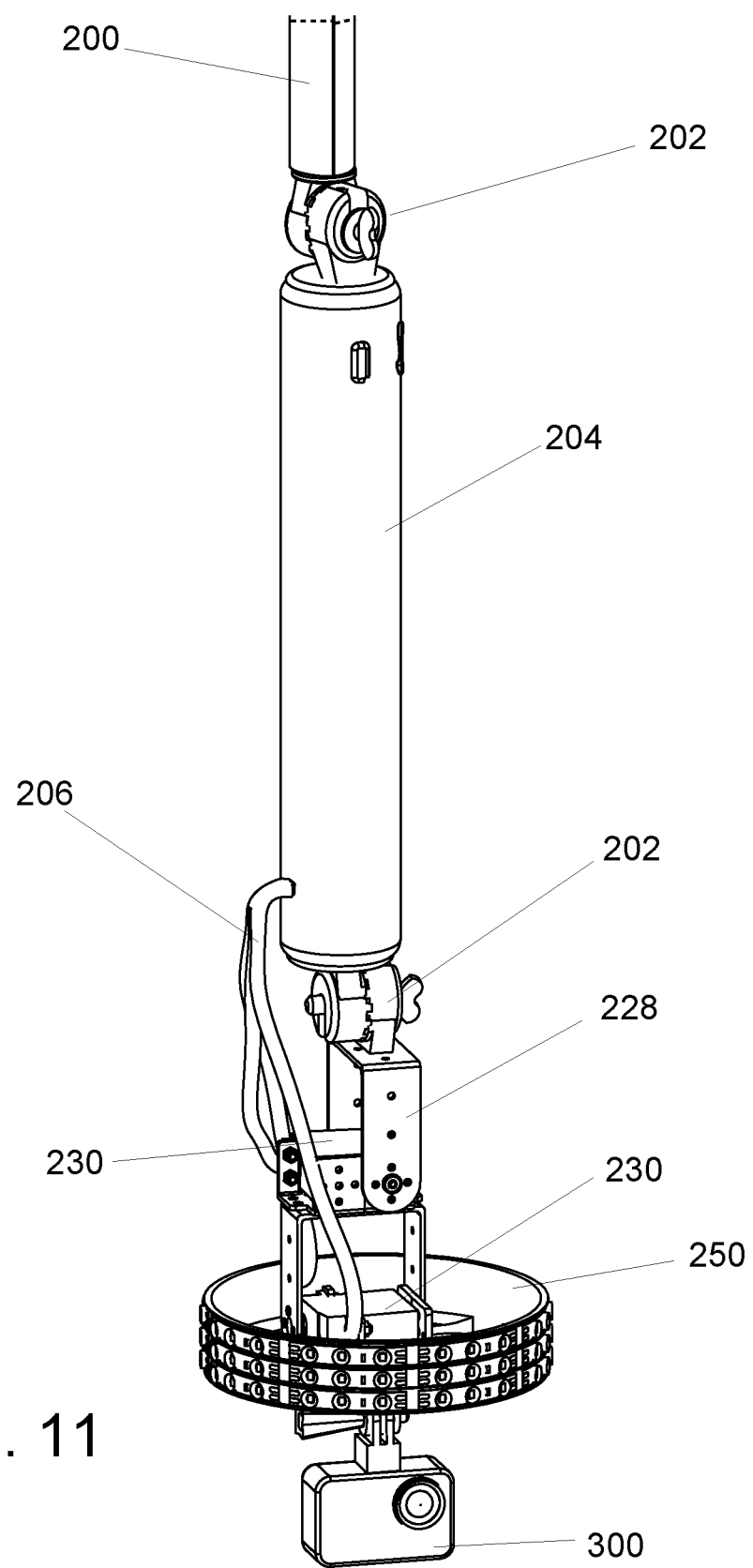
FIG. 11 is a partial sectional top front perspective view of a stabilized electrical manhole inspection tool shown with a camera, servo motors and light emitting source mounted to an end of the extendable pole in accordance with the aspects of the present invention shown with a cover removed.
Figure 12:
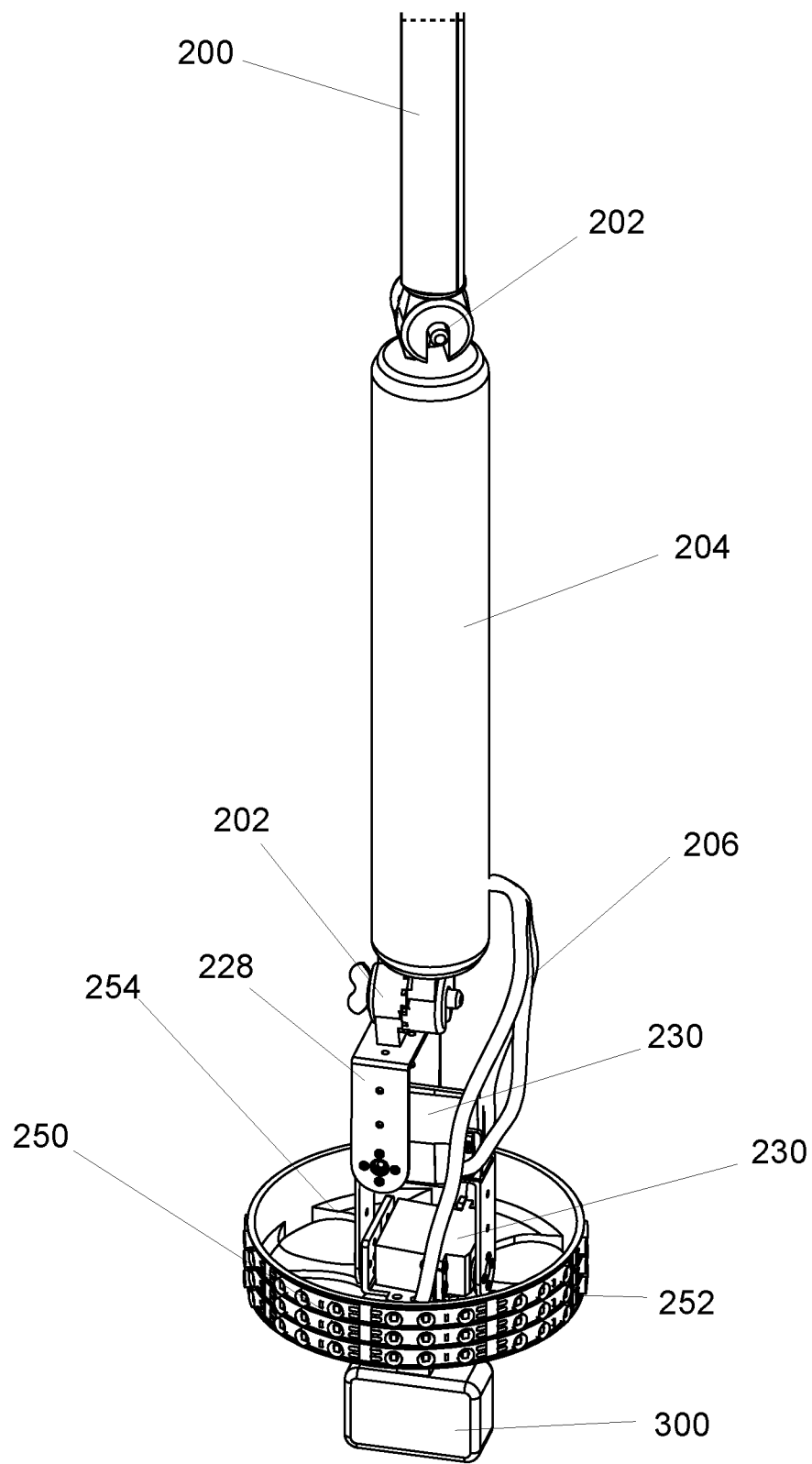
FIG. 12 is a partial sectional top back perspective view of a stabilized electrical manhole inspection tool shown with a camera, servo motors and light emitting source mounted to an end of the extendable pole in accordance with the aspects of the present invention shown with a cover removed.
Figure 13:
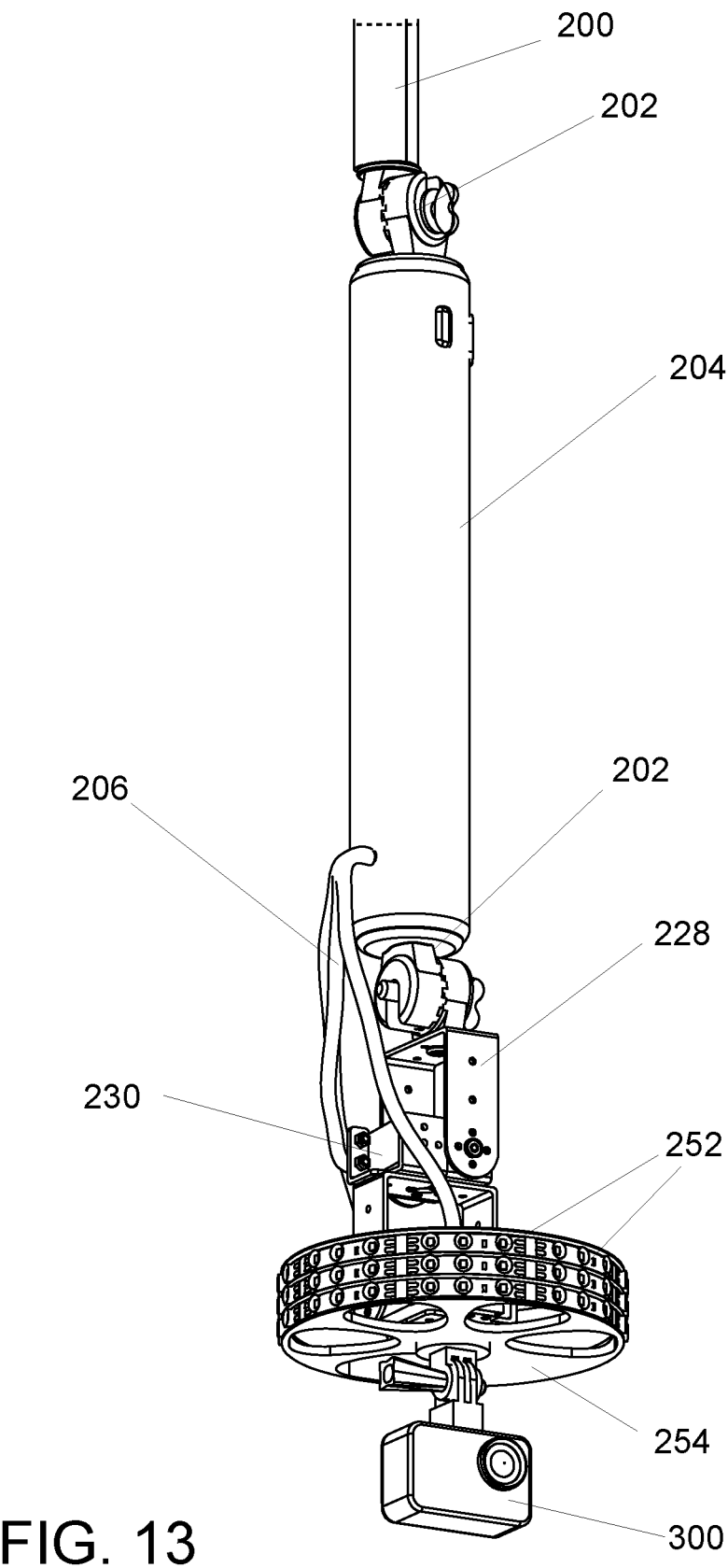
FIG. 13 is a partial sectional bottom front perspective view of a stabilized electrical manhole inspection tool shown with a camera, servo motors and light emitting source mounted to an end of the extendable pole in accordance with the aspects of the present invention shown with a cover removed.
Figure 14:
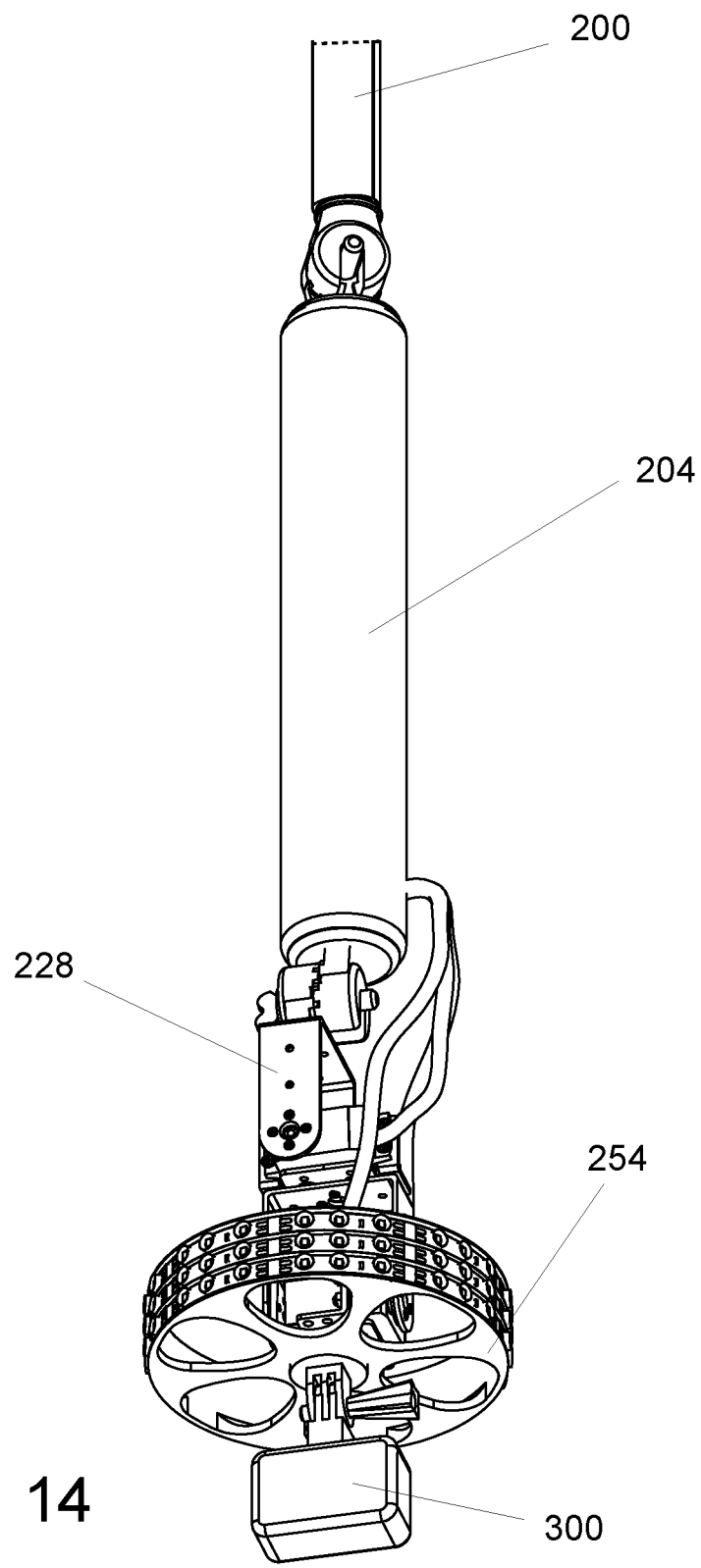
FIG. 14 is a partial sectional bottom back perspective view of a stabilized electrical manhole inspection tool shown with a camera, servo motors and light emitting source mounted to an end of the extendable pole in accordance with the aspects of the present invention shown with a cover removed.
Figure 15:
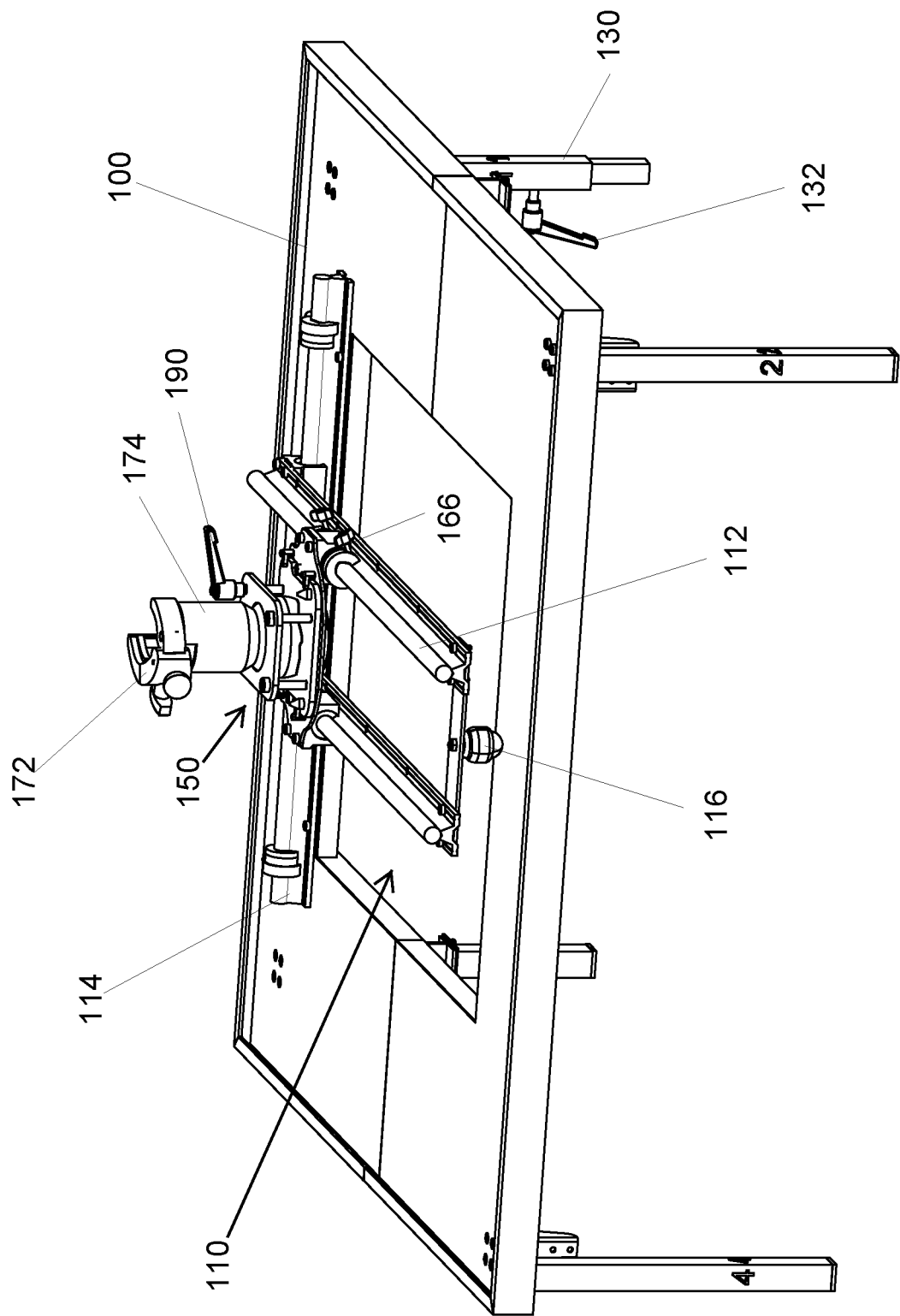
FIG. 15 is a top front perspective view of the platform and mounting bracket of the inspection tool in accordance with the aspects of the present invention.
Figure 16:
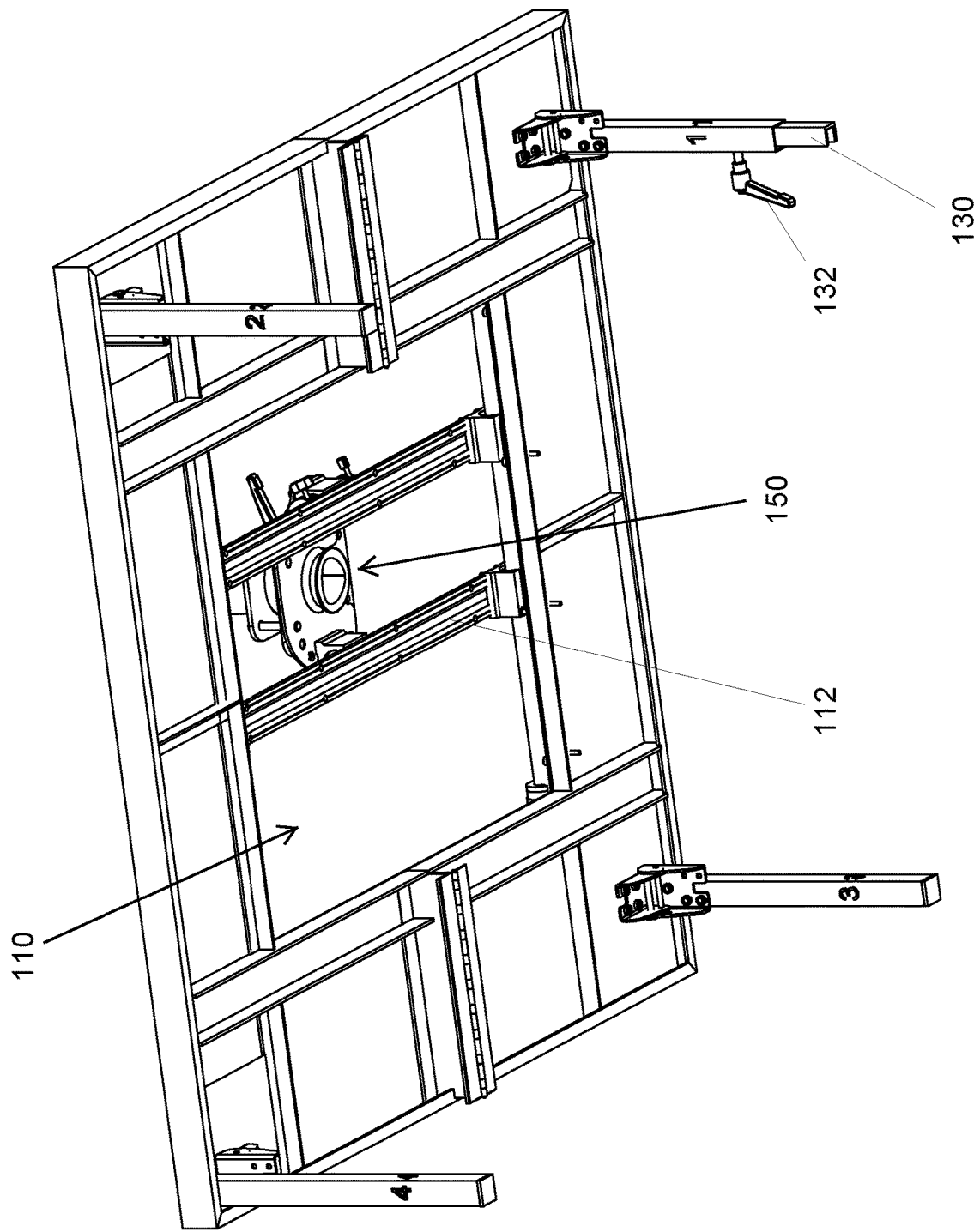
FIG. 16 is a bottom front perspective view of the platform and mounting bracket of the inspection tool in accordance with the aspects of the present invention.
Figure 17:
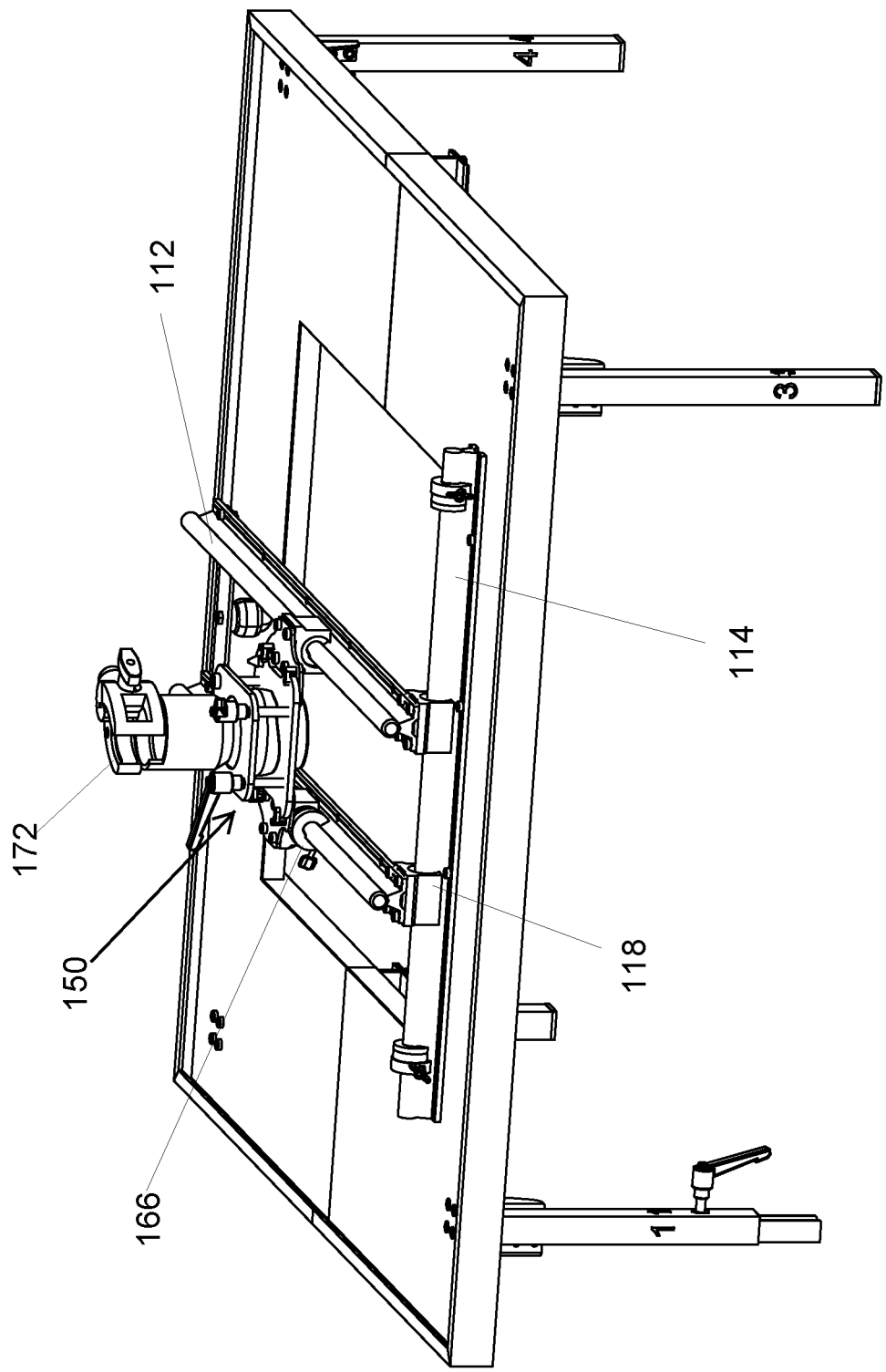
FIG. 17 is a top back perspective view of the platform and mounting bracket of the inspection tool in accordance with the aspects of the present invention.
Figure 18:
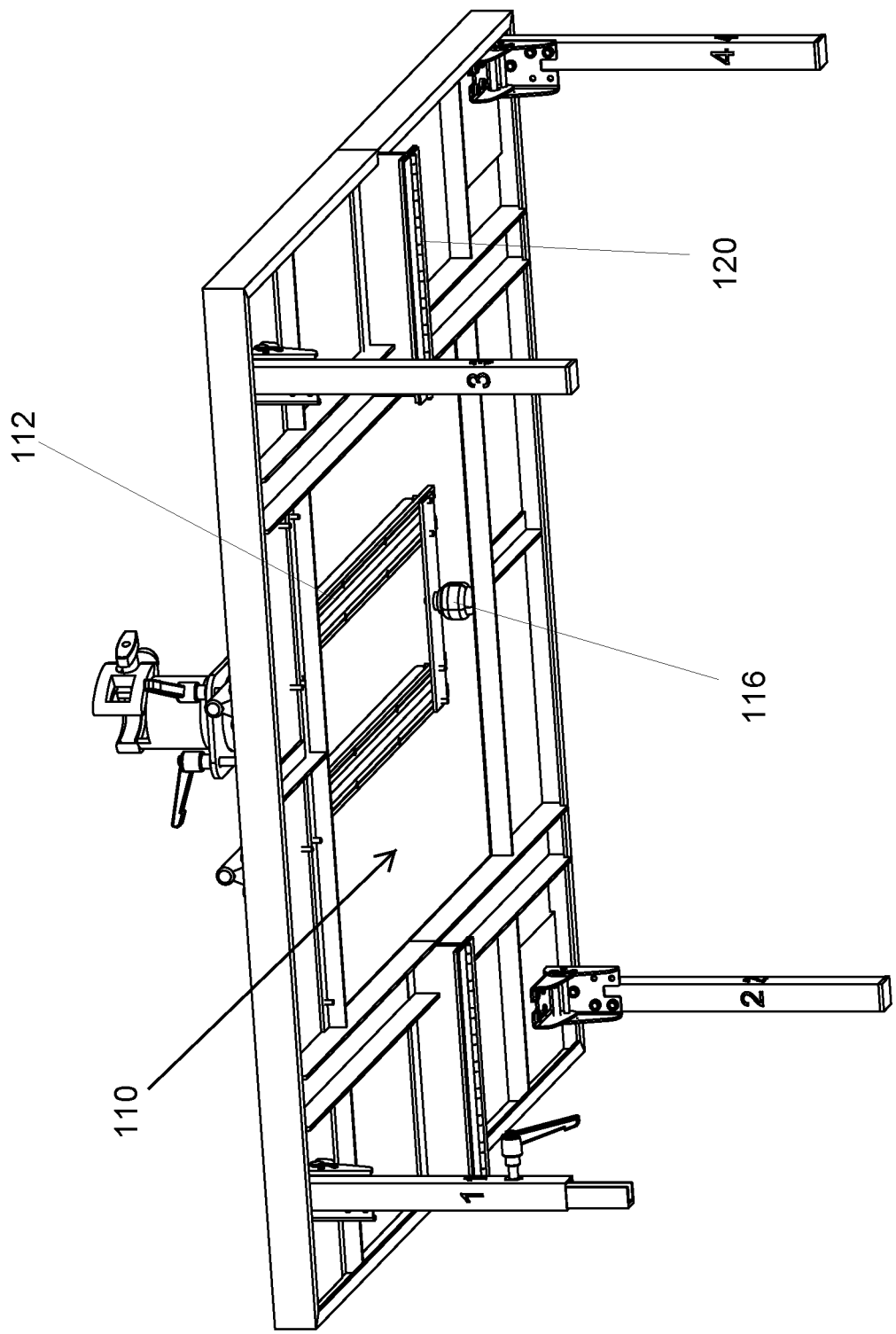
FIG. 18 is a bottom back perspective view of the platform and mounting bracket of the inspection tool in accordance with the aspects of the present invention.
Figure 19:
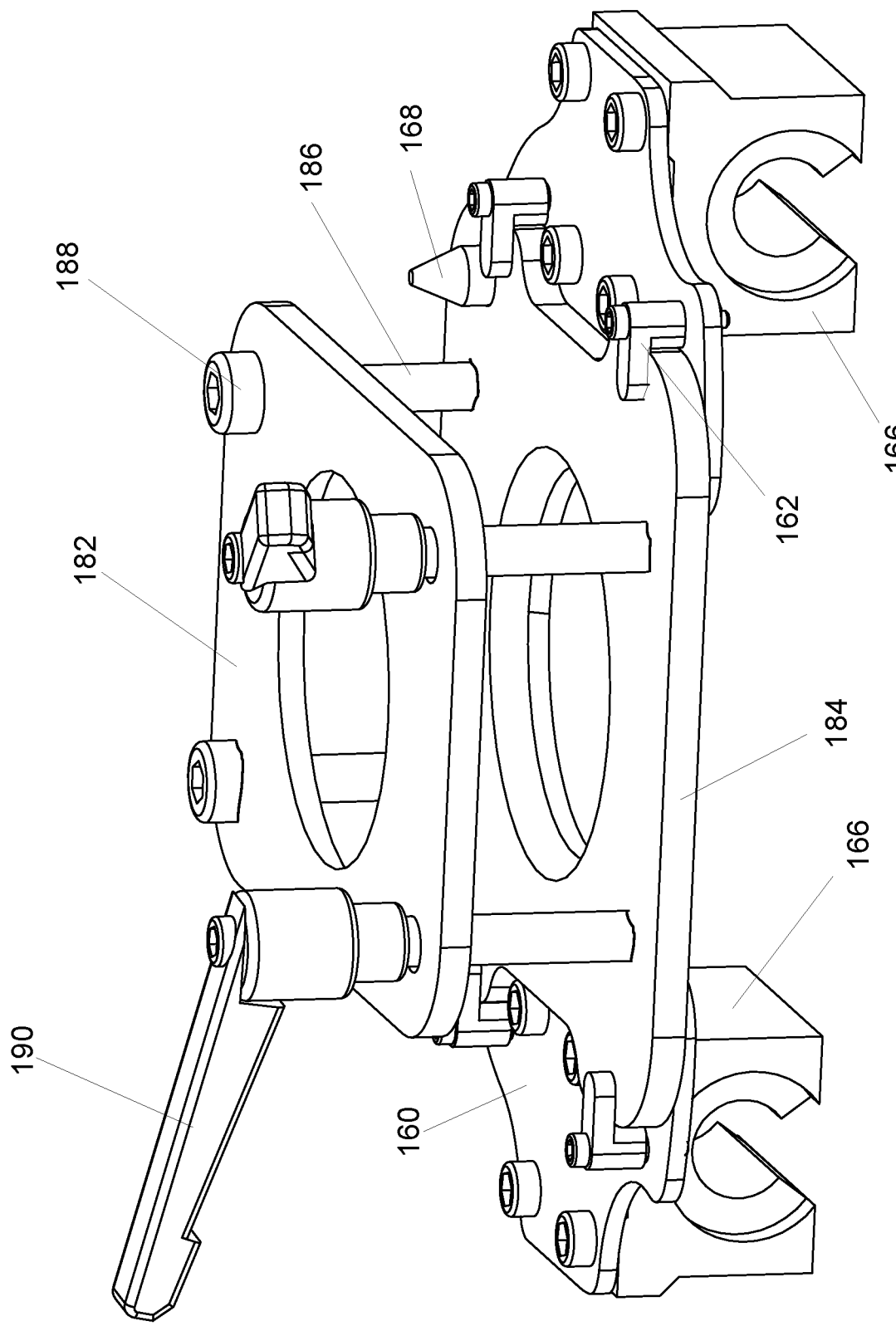
FIG. 19 is a top perspective view of the ball receiving receptacle and ball clamp of the mounting bracket of the inspection tool in accordance with aspects of the present invention.
Figure 20:
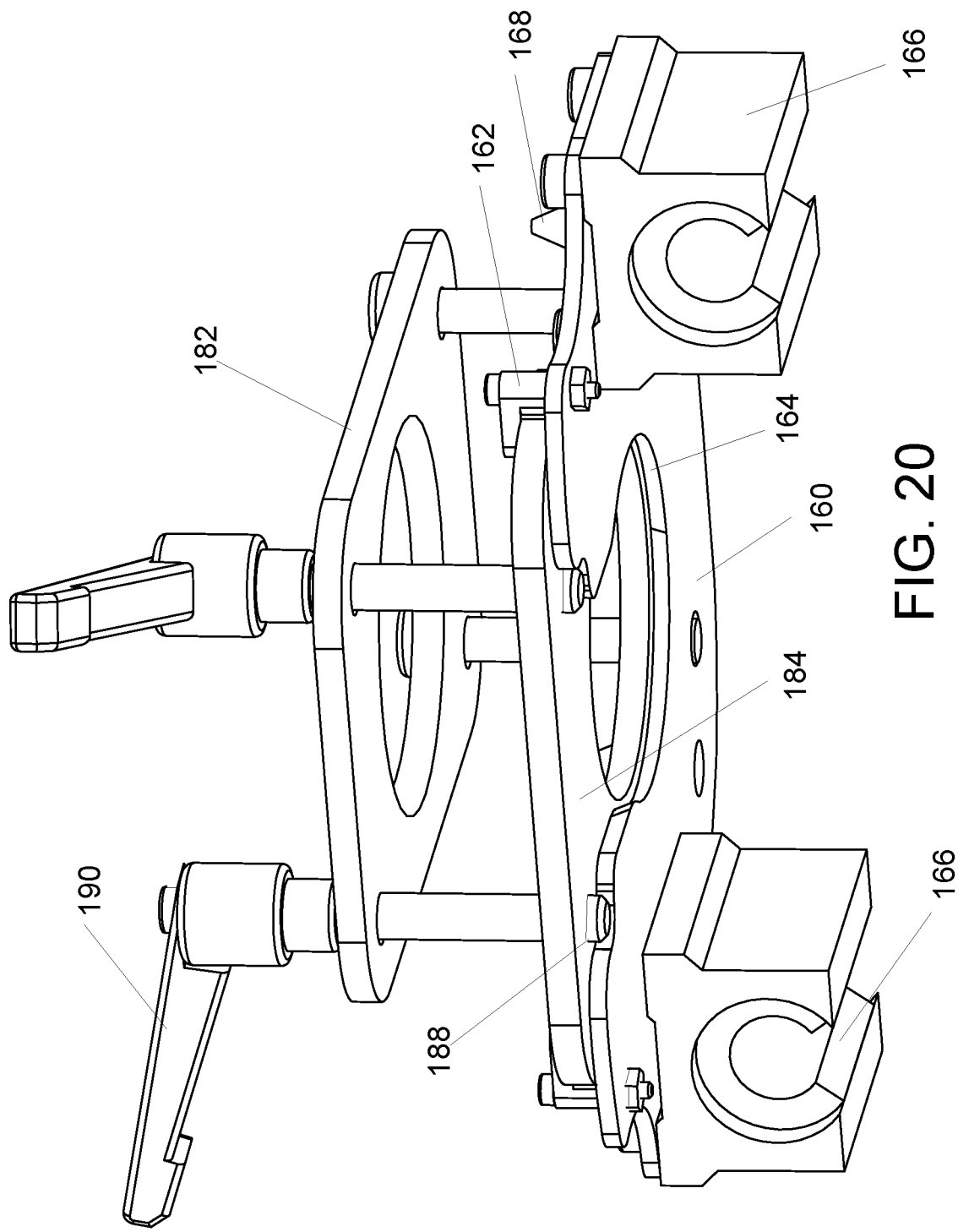
FIG. 20 is a bottom perspective view of the ball receiving receptacle and ball clamp of the mounting bracket of the inspection tool in accordance with aspects of the present invention.
Figure 21:
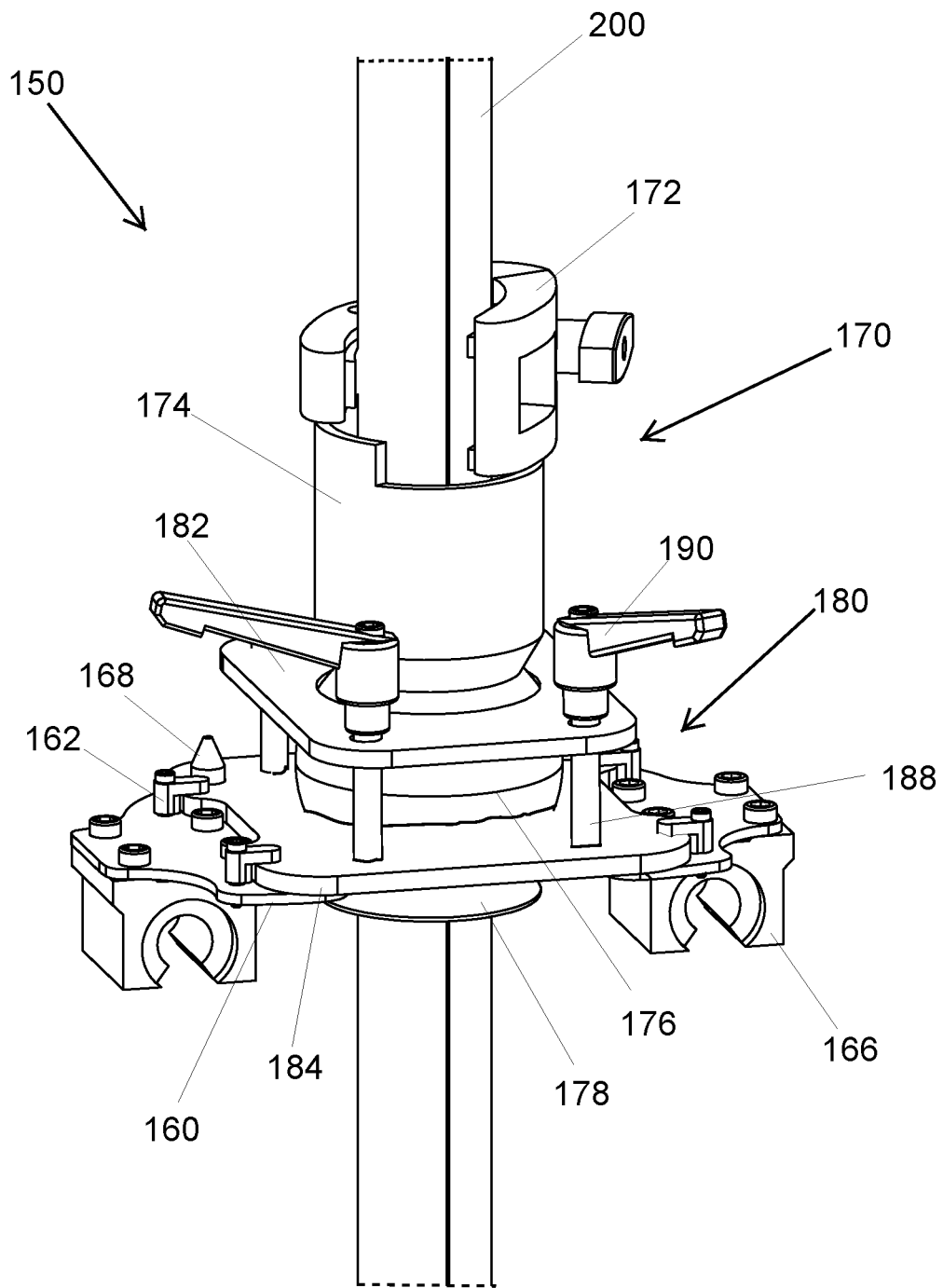
FIG. 21 is a partial sectional top perspective view of the mounting bracket of the inspection tool in accordance with aspects of the present invention.

FIGS. 1-2 generally illustrates use of the underground inspection tool 10 to inspect and document the conditions within the underground vault 14. An underground electrical vault may contain a maze of electrical wires 16 entering and exiting the vault. An inspector may wish to proactively create images of the entire vault, all objects within the vault and the exact location of those objects. By way of example, an inspector may wish to identify, trace, document, create virtual labeling, and map each separate wire or conductor entering and exiting the vault for future reference. At times, an inspector may need to physically enter the vault 14 through the access point 20 and with the use of ladder 18.

The inspection tool 10 of the present invention includes a stable platform 100 that is centered over the access point 20. An electrical ground wire is coupled between the platform 100 and ladder 18. Mounting bracket 150 is engaged to the platform and couples with the extendable pole 200. As described in greater detail below, a height adjustable stop or clamp 172 is used to control the depth the pole 200 is lowered into the vault 14. A secondary stop 210 may be mounted near the end of the pole 200 to act as a precautionary stop in the event the clamp 172 is not engaged to the pole 200. Once the pole is in position, LED light array 250 emits light in 360 degrees from the top to the bottom of the vault 14. Camera 300 is wirelessly linked to the user via a receiver, such as a note pad, tablet, or other electronic device having an app or other software that allows the user to orient the camera and take and receive images in any direction within the vault without the need to enter the vault.

With reference to FIGS. 3-6 the inspection tool 10 will be described in greater detail. Inspection tool 10 includes a platform 100, an extendable pole 200, a mounting bracket 150, a camera 300, and a light emitting source or LED array 250. The platform 100 includes a central opening 110 that centers over an access point 20 to underground structures. The central opening 110 extends through the platform 100 to allow the inspection tool 10 to be inserted into the access point. Mounting bracket 150 couples to the platform 100 in alignment with the central opening 110. The mounting bracket 150 is adapted for coupling the extendable pole 200 to the platform 100. Mounting bracket 150 includes glides 166 that slide over rails 112 mounted to the platform 100 parallel with the y axis of the platform. A cross rail is mounted to the platform orthogonal to the rails 112 parallel with the x axis of the platform and glides 118 assist the rails to slide over the cross rails orthogonal to the sliding of the mounting bracket 150. In this manner, the center of mounting bracket 150 may be oriented along the x or y axis of the platform opening throughout the central opening 110.

The camera 300 is coupled to the extendable pole 200 via a camera mount 220 (as further illustrated in FIGS. 11-14). The camera mount 220 engages the camera to an end of the extendable pole. The camera 300 also has a wireless link, such as Bluetooth, to transmit and receive signals to and from a receiver positioned near the base of the platform 100 and access point 20. Additionally, the camera mount includes pivot brackets 228 and servo motors 230 such that the servo motors 230 rotate the camera in at least one of a vertical, horizontal and circular orientation relative to a longitudinal axis of the extendable pole 200. Of course, those skilled in the art will appreciate that a gimbal may be used to control the orientation of the camera without departing from the scope of the invention. Further, servo motors 230 are linked to a receiver, such as a laptop having an app or SaaS that allows the user to transmit and receive servo control signals to and from the receiver to the servo motors 230. The light emitting array or source 250 is also coupled to the extendable pole 200 proximate the camera.

Figure 22:
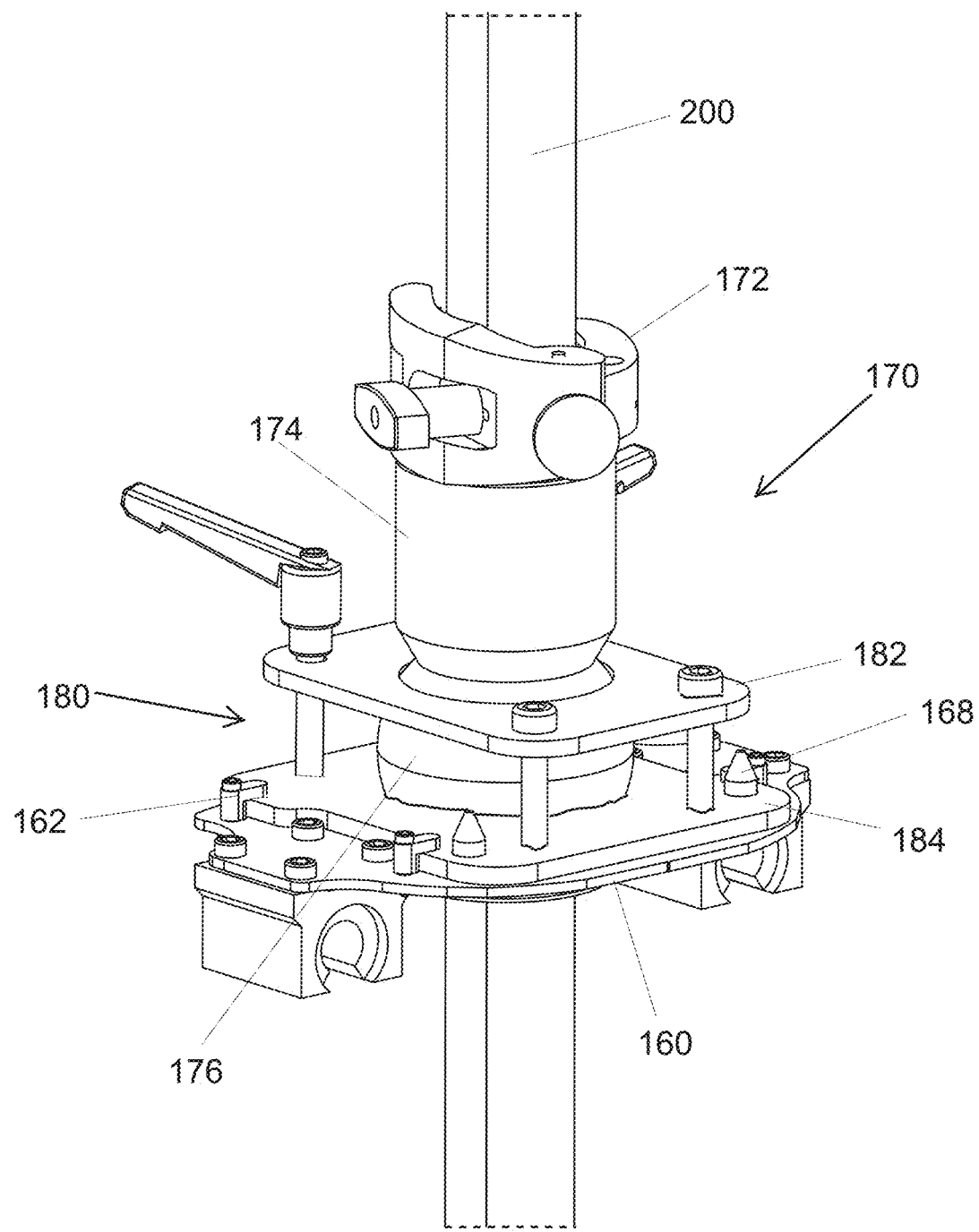
FIG. 22 is a partial sectional top side perspective view of the mounting bracket of the inspection tool in accordance with aspects of the present invention.
Figure 23:
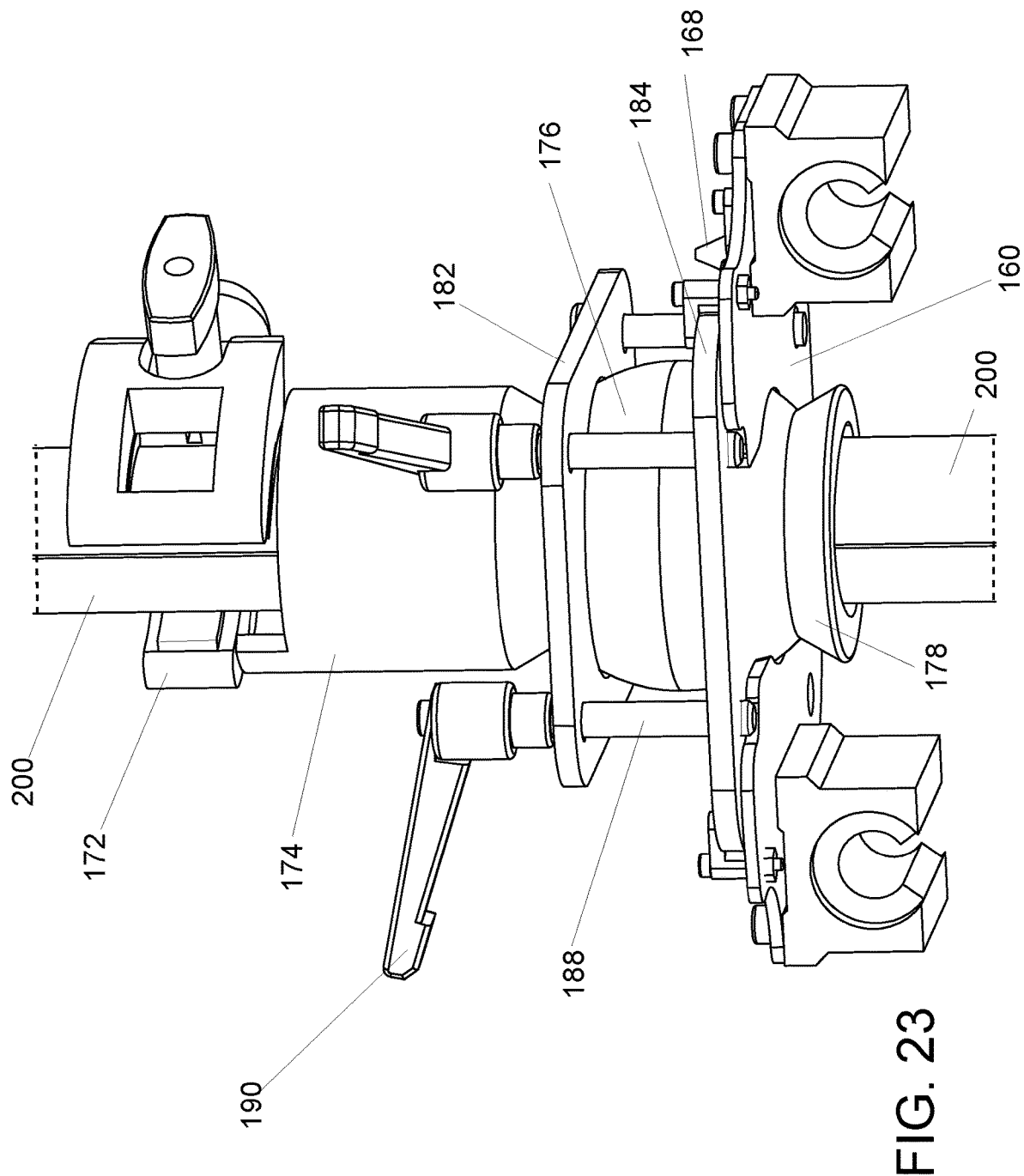
FIG. 23 is a partial sectional bottom perspective view of the mounting bracket of the inspection tool in accordance with aspects of the present invention.

As further illustrated in FIGS. 7-10 and 15-18 the platform 100 includes an electrical ground wire 60 electrically coupled to it via a platform coupling 64 which may, by way of example comprise a ring terminal and screw. The other end of the ground wire 60 includes a clamp 62 or other quick connect/disconnect device of known suitable construction. Clamp 62 quickly fixes to ladder 18 to establish an electrical path between the ladder and the platform 100 secured to the ground. The platform 100 may be supported by length adjustable legs 130 or supported on opposing sides of the platform by extendable slides 140 (see FIGS. 23-24). When the platform is supported by slides 140, the slides may be further mounted to a vehicle to provide further mobility and rigidity for the platform. Platform 100 may have two halves that are hinged together via hinge 120 such that the platform size may be reduced for transportation and storage (see FIG. 22).

Figure 24:
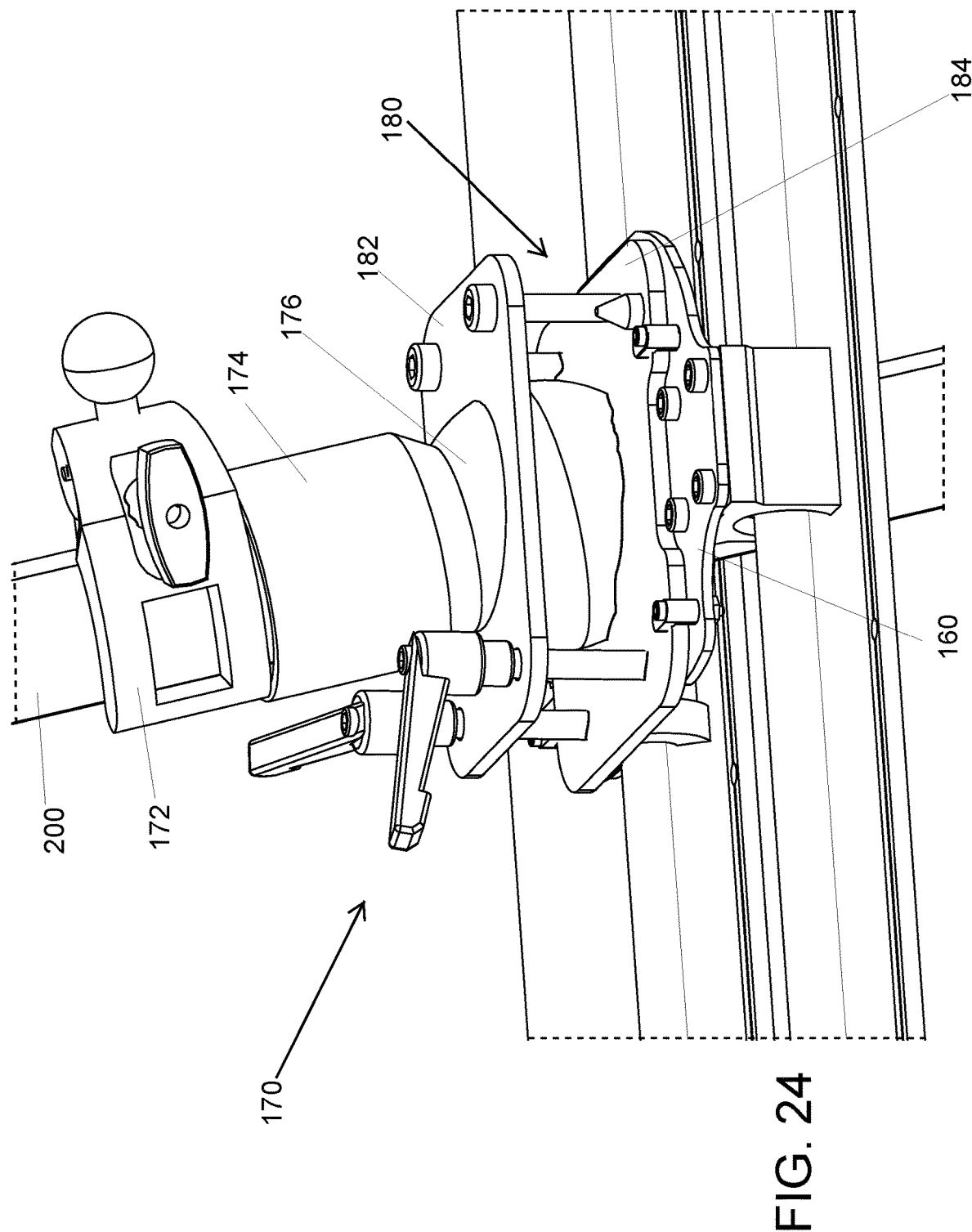
FIG. 24 is a partial sectional perspective view of the mounting bracket of the inspection tool in accordance with aspects of the present invention showing the extendable pole oriented and clamped at an angle.

As illustrated in FIGS. 19-24, mounting bracket 150 of platform 100 has a bottom plate 160, an angle alignment adjustment member and an alignment lock or ball clamp 180. The bottom plate 160 includes a slot or ball receiving receptacle 164 and glides 166. The glides 166 couple the plate 160 (and, in general, the mounting bracket 150) to the rails 112 of the platform 100. Angle alignment adjustment member 170 includes a height adjustment stop or quick release clamp 172, collar 174, ball 176 and bottom angle stop 178 on the ball 176. Without limitation intended, the collar 174, ball 176 and angle stop 178 may be made integral or may be coupled or fastened together using known suitable construction. The collar, ball and angle stop include apertures extending therethrough that are adapted for receiving the extendable pole 200 to allow the pole to slide through the apertures. Ball clamp 180 includes top plate 182, bottom plate 184, screws 188 and quick adjust handles 190. The plates include ball receiving receptacles or holes extending therethrough. When the ball clamp 180 is used, the ball 176 is sandwiched between top plate 182 and bottom plate 184. When the screws 188 are tightened, the plates press against the ball and prevent rotation. The bottom plates 184 rests flat on the bottom plate 160. Alignment pins 168 and tabs 162 retain the plate 184 in a fixed position relative to plate 160. In this manner, the angle of the length axis of the extendable pole may be adjusted relative to the plane of the Mounting bracket 150 (and thus the plane of the platform 100). FIG. 24 illustrates the pole 200 fixed at an angle of approximately 15 degrees. The angle stop 178 restricts the pole from being angled beyond a preferred maximum angle. Pillars 186 may be slipped over screws 188 and may have a fixed length so that the screw 188 is limited to pulling the plates 182 and 184 together against the ball 176 by the length of the separation pillars 186.

Figure 25:
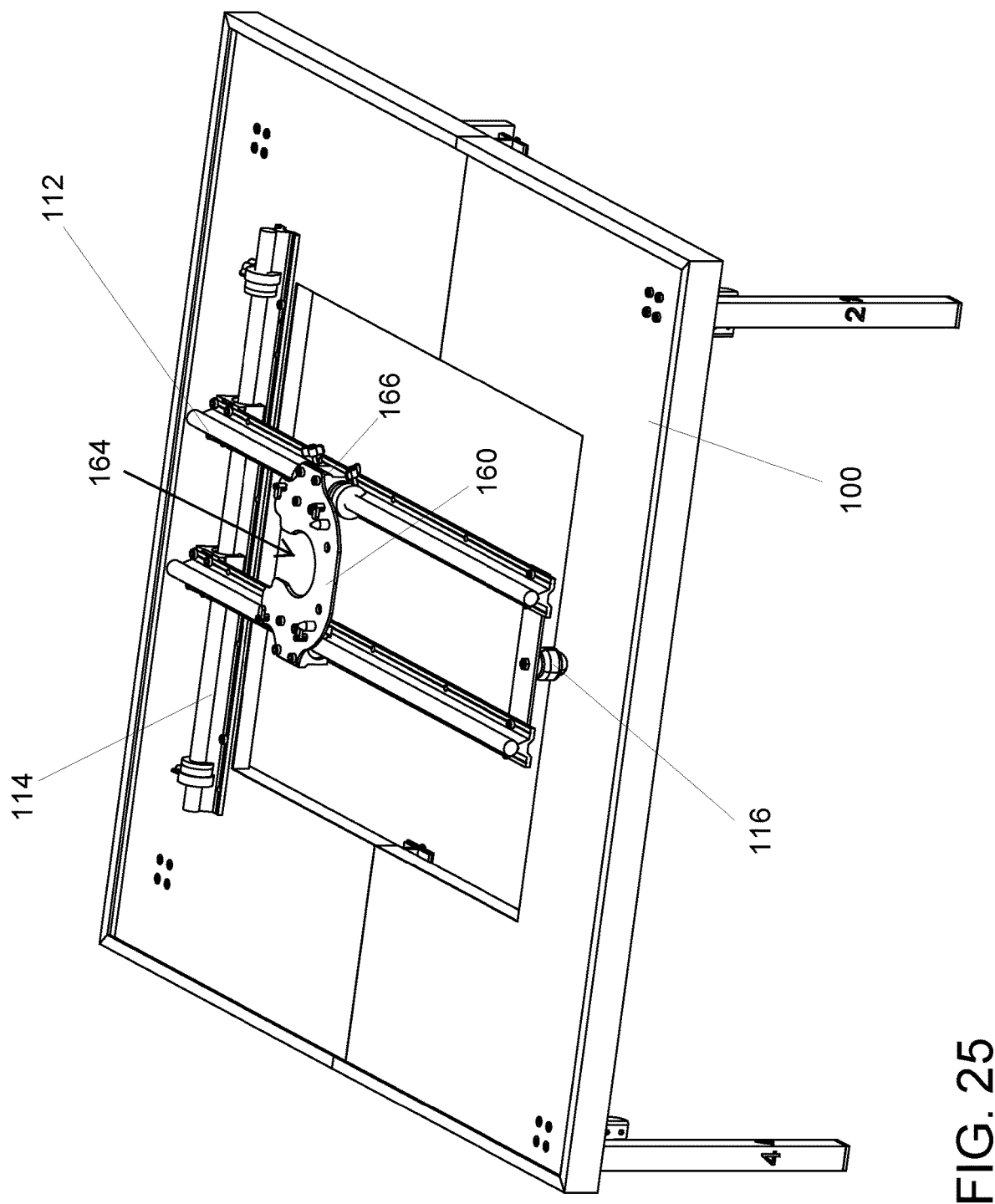
FIG. 25 is a top front perspective view of the platform of the inspection tool in accordance with the aspects of the present invention.
Figure 26:
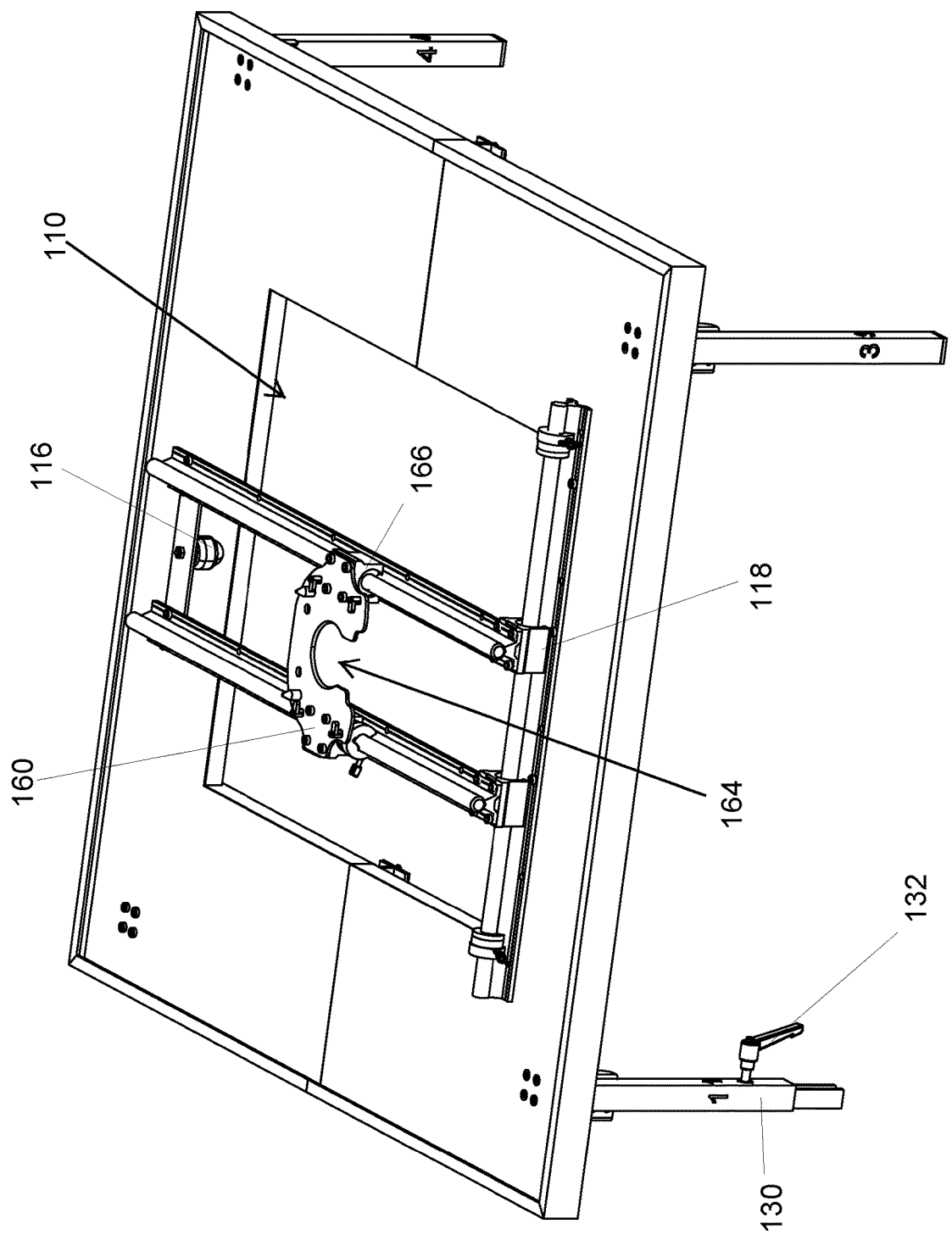
FIG. 26 is a top back perspective view of the platform of the inspection tool in accordance with the aspects of the present invention.
Figure 27:
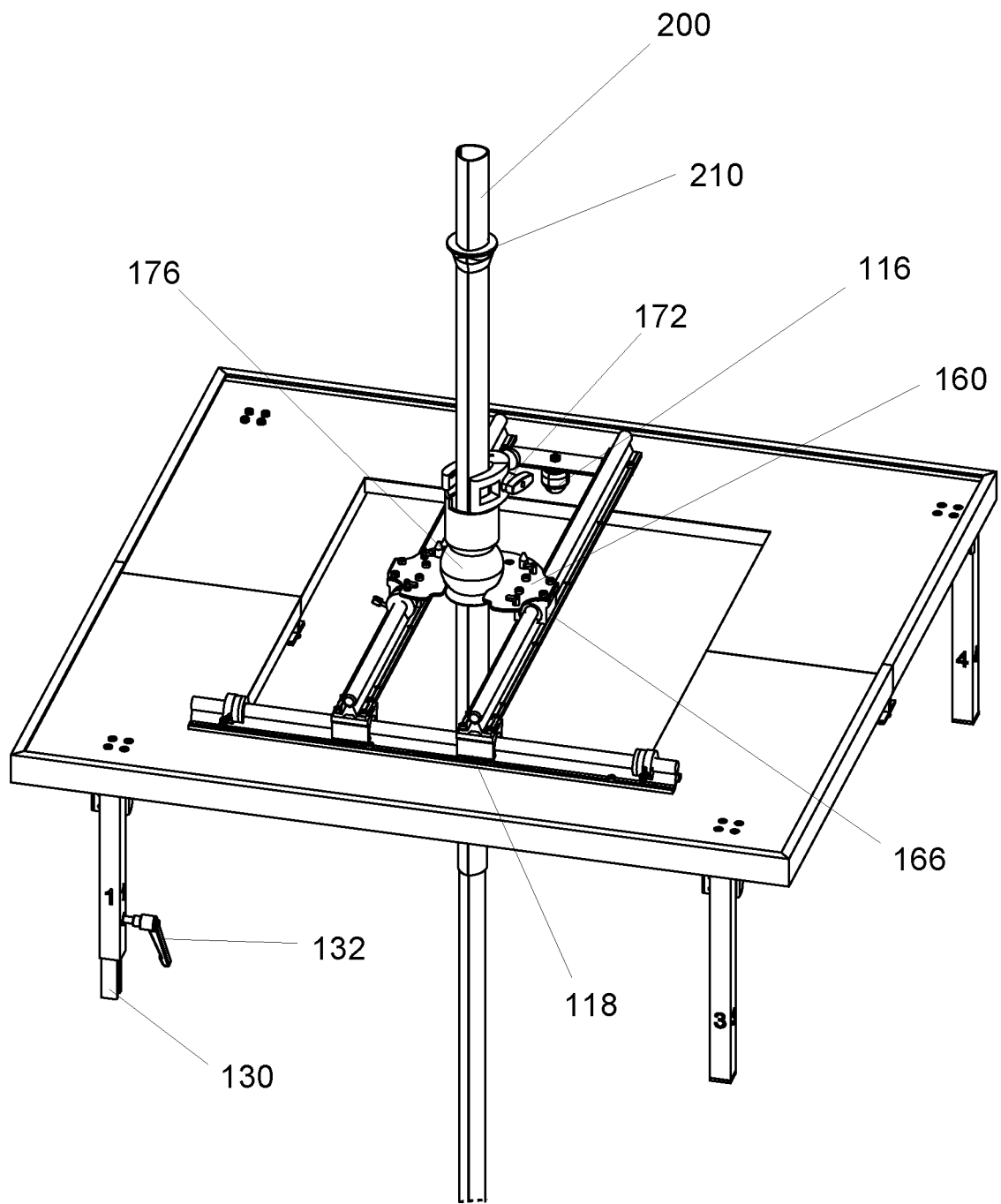
FIG. 27 is a partial sectional top back perspective view of the platform of the inspection tool in accordance with the aspects of the present invention shown with the extendable pole coupled to the ball receiving receptacle of the mounting bracket of the platform.
Figure 28:
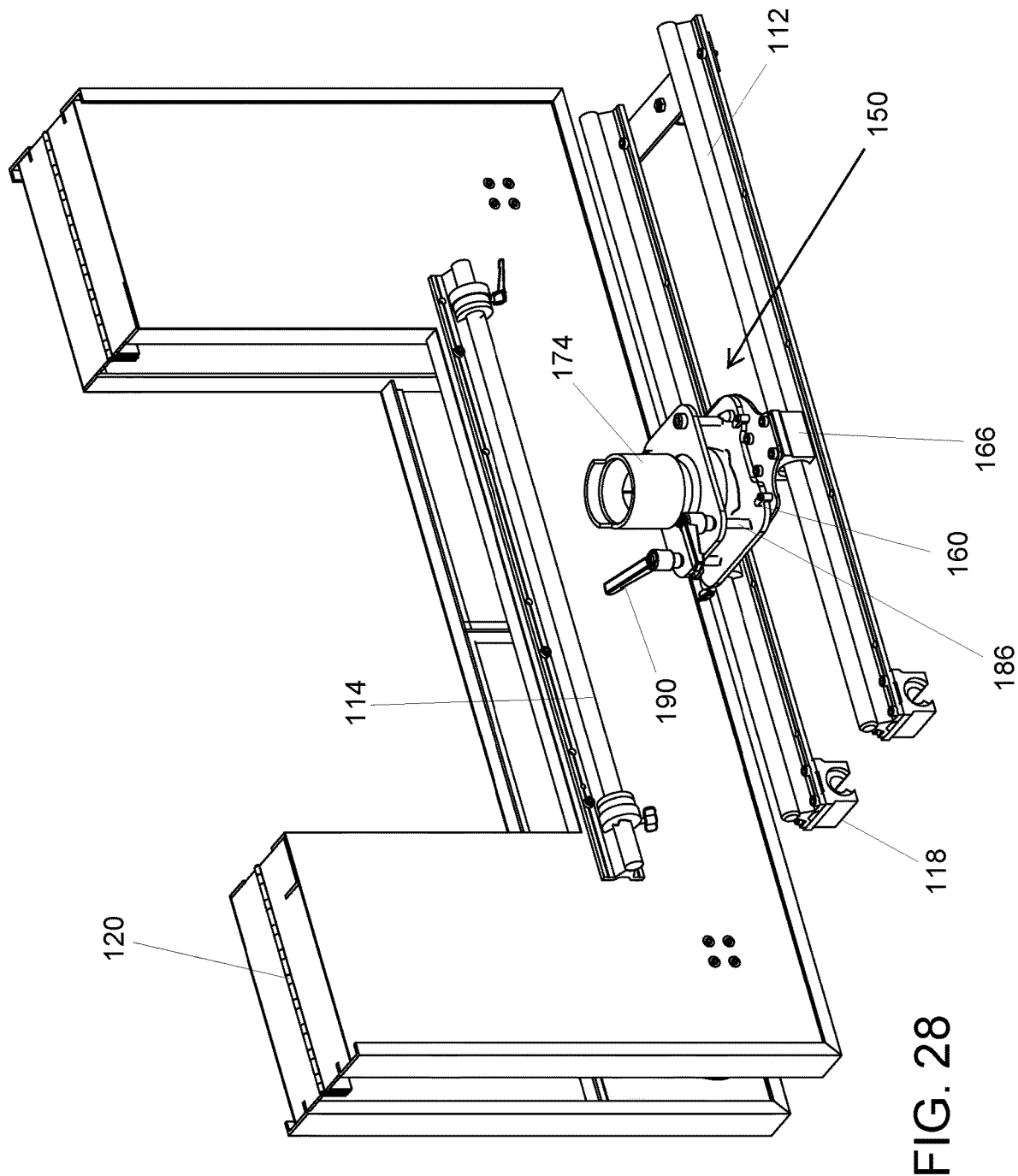
FIG. 28 is a perspective view of platform and mounting bracket of the inspection tool in accordance with aspects of the invention shown in a transport orientation.
Figure 29:
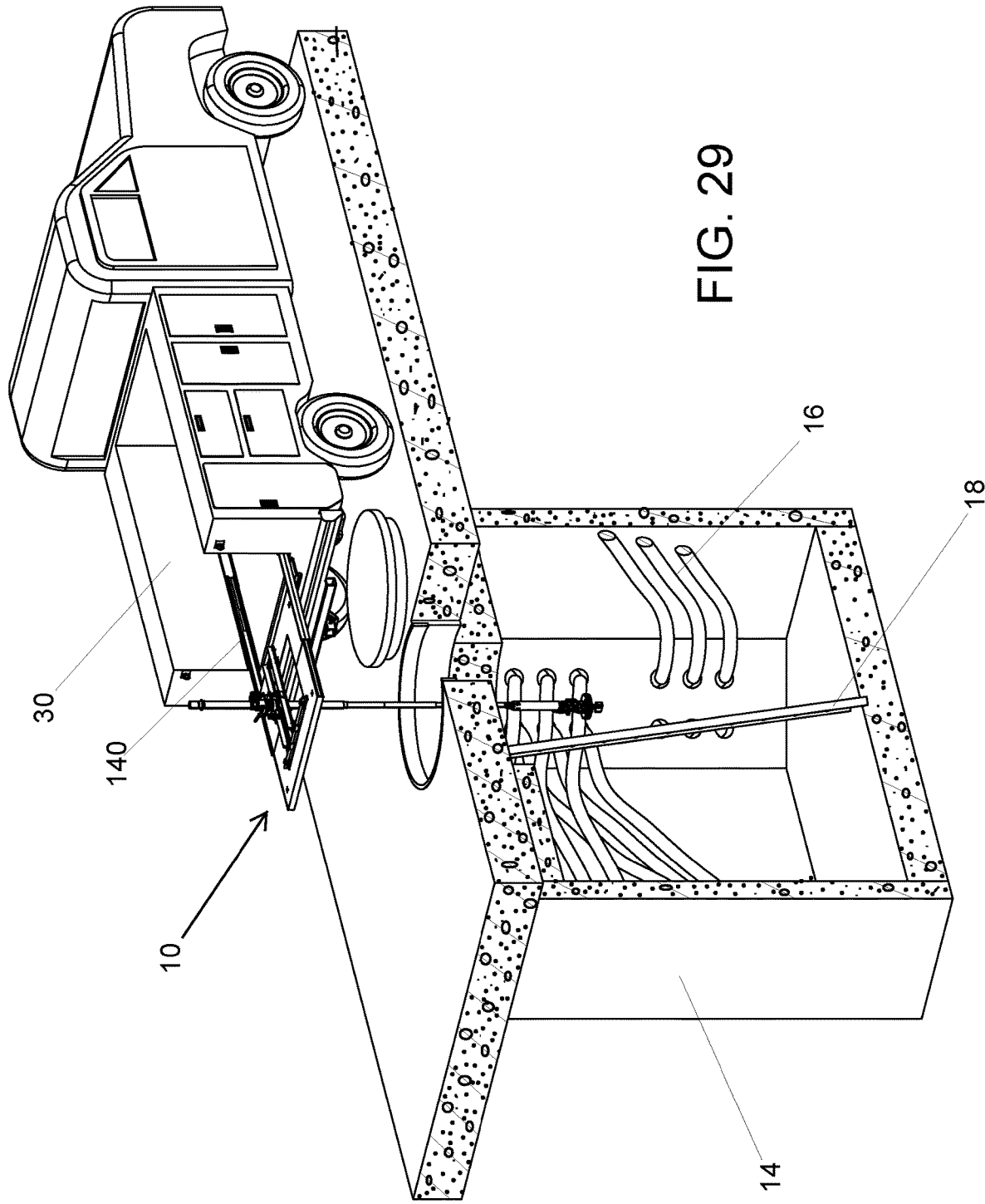
FIG. 29 is a partial sectional top perspective view of a stabilized electrical manhole inspection tool in accordance with aspects of the present invention coupled to a vehicle and aligned over the access point of an electrical vault.
Figure 30:
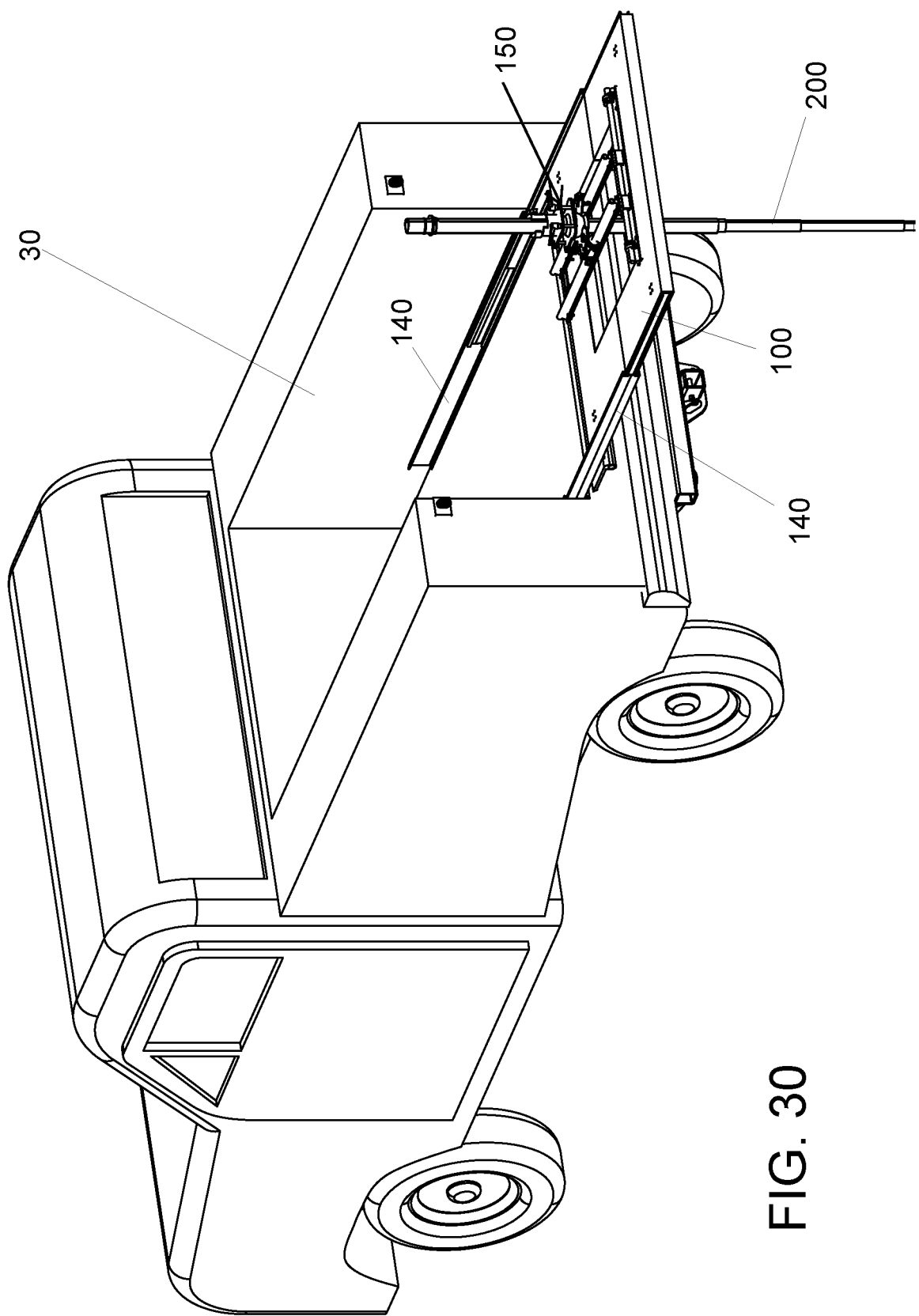
FIG. 30 is a partial sectional top perspective view of a stabilized electrical manhole inspection tool in accordance with aspects of the present invention coupled to a vehicle and aligned over the access point of an electrical vault.

In use, the user may use the ball clamp 180 to fix a desired angle of the extendable pole relative to the platform and access point (see FIGS. 15-18). The pole 200 slides through the collar 174 and ball 176 such that the pole may be used to lower the camera 300 to a desired height within the structure. The height adjustment stop 172 is used to restrict the pole at the desired height. The stop 172 is fixed to the pole 200 and engages the top of collar 174. The collar and stop may include alignment slots or configurations to restrict the pole from rotating when the stop 172 is engaged with the collar 174. As illustrated in FIGS. 25-27, the user may alternatively use the mounting bracket 150 without using the ball clamp 180. The ball 176 may simply engage the receptacle formed in the bottom plate 160. The weight of the pole 200 and gravity will align the ball 176 against the bottom plate 160. The height adjustment stop or clamp 172 is used to fix the length of the pole extending into the access opening.

As mentioned above, and with reference to Figures, the present invention provides a method that facilitates safe imaging, identification, tracing, and mapping of existing electrical conductors and conduit locations. The method utilizes inspection tool 10, described in greater detail above, that includes a platform 100, an extendable pole 200, a mounting bracket 150, a camera 300, and a light emitting source or LED array 250. Once the user has obtained an inspection tool 10 of the present invention the user unfolds and extends the legs 130 of the platform. The central opening 110 of the platform 100 is then centered over the access point 20. Alternatively, the user may align a vehicle 30, equipped with the inspection tool 10, adjacent the opening 20 and slide the tool 10 out of the vehicle so that the central opening 110 of the platform is aligned with the access point 20.

User positions the extendable pole 200 within the central opening 110 of the platform 100 and couples the extendable pole 200 to the apparatus mounting bracket 150. User may engage a safety stop or bumper 210 to the extendable pole 200. The user also engages a preferred camera 300 to the extendable pole 200 with a camera mount 220. The extendable pole 200 is lowered into the structure 14 while observing images transmitted from the camera 300 to a receiver such as a tablet, notepad or smart phone. The user adjusts the mounting bracket 150 so that the extendable pole 200 is lowered to a desirable orientation to align the camera 300 at a preferred orientation within the vault. The camera, servos 230, and light emitting sources are powered by power supply 204. User controls the servo motors by transmitting control commands to the servo to adjust the camera orientation within the access point.

Those skilled in the art will appreciate that code and micro controls of known suitable construction may be used to allow the user to transmit signals and data between the camera and receiver. By way of example, and without limitation intended, the camera may be electrically coupled with an electronics board having a Bluetooth communication chip, along with battery resources. The cameras and servos are linked to the receiver or tablet that includes an app or other software that allows the user to capture photos or control movement of the camera in a desired direction. For example, a designated command or button may be used to trigger or capture an image and other commands or keys may be used to control movement of the servos. As the user controls movement of the servos, the user may capture and record images of the structure as desired. The apps and software in accordance with the present invention may further include features that allow for editing the images, adding identifying information to the images, storing images in defined databases and otherwise coding the images and structure to allow future identification, tracing, and mapping.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open-ended sense in that elements in addition to those enumerated may also be present. Other examples will be apparent to those of skill in the art upon reviewing this document.

The following claims are incorporated into this description.

The invention claimed is:

1. An inspection apparatus for remotely inspecting underground electrical manhole vaults and other structures, the apparatus comprising:
a platform capable of centering over an access point of a selected structure, the platform including a central opening extending through the platform;
an extendable pole;
a mounting bracket coupled to the platform in alignment with the central opening, wherein the mounting bracket is adapted for coupling the extendable pole to the platform, wherein the mounting bracket further includes an angle alignment member that is adapted to engage and disengage with the extendable pole, and further wherein the angle alignment member includes a ball fixed about the extendable pole such that the ball is adapted for coupling to a ball clamp so that the extendable pole may be pivoted, swiveled and fixed about the mounting bracket in controlled increments;
a camera having a camera mount that engages the camera to an end of the extendable pole, the camera further having a link to transmit and receive signals to and from a receiver positioned near the structure, and further wherein the camera mount includes servo motors such that the servo motors rotate the camera in at least one of a vertical, horizontal and circular orientation relative to a longitudinal axis of the extendable pole, and further wherein the servo motors are linked to the receiver to transmit and receive servo control signals to and from the receiver; and
light emitting sources coupled to the extendable pole proximate the camera wherein the light emitting sources emit light to illuminate 360 degrees about the extendable pole.

2. The apparatus as recited in claim 1, further including a wire having one end coupled to the platform and another end of the wire coupled to an electrical ground.

3. The apparatus as recited in claim 1, wherein the platform is supported by length adjustable legs.

4. The apparatus as recited in claim 1, wherein the platform is supported on opposing sides of the platform by extendable slides.

5. The apparatus as recited in in claim 1, wherein the mounting bracket further includes a ball receiving receptacle plate.

6. The apparatus as recited in claim 5, wherein the ball receiving receptacle plate includes tabs to retain a bottom of the angle alignment member against the ball receiving receptacle plate.

7. The apparatus as recited in claim 1, wherein the angle adjustment member further includes a height adjustment assembly coupled to the extendable pole.

8. An inspection apparatus for remotely inspecting underground electrical manhole vaults and other structures, the apparatus comprising:
a platform capable of centering over an access point to a structure, the platform including a central opening and rails mounted on opposing sides of the central opening, wherein the platform is divided into two halves connected together by hinges;
an extendable pole;
a mounting bracket coupled to the rails of the platform, wherein the mounting bracket is adapted for coupling the extendable pole to the platform;
a wire having one end coupled to the platform and another end of the wire coupled to an electrical ground;
a camera having a camera mount that engages the camera to an end of the extendable pole, the camera further having a link to transmit and receive signals to and from a receiver positioned near the structure, and further wherein the camera mount includes servo motors such that the servo motors are capable of rotating the camera in at least one of a vertical, horizontal and circular orientation relative to a longitudinal axis of the extendable pole, and further wherein the servo motors are linked to the receiver to transmit and receive servo control signals to and from the receiver; and
light emitting sources coupled to the extendable pole proximate the camera wherein the light emitting sources emit light to illuminate 360 degrees about the extendable pole.

9. The apparatus as recited in claim 8, wherein the mounting bracket further includes a base plate, an angle adjustment member and a height adjustment member whereby the height adjustment member is adapted to engage and disengage with the extendable pole.

10. The apparatus as recited in claim 9, wherein the angle adjustment member further includes a ball and the mounting bracket further includes a ball clamp such that the ball and ball clamp couple with the extendable whereby the extendable pole may be pivoted and swiveled about the mounting bracket in controlled increments.

11. The apparatus as recited in in claim 10, wherein the mounting bracket further includes a ball receiving receptacle.

12. The apparatus as recited in claim 11, wherein the ball receiving receptacle includes tabs adapted to retain a bottom of the angle adjustment member against the ball receiving receptacle.

13. The apparatus as recited in claim 10, wherein the angle adjustment member further includes a height adjustment member coupled to the extendable pole.

14. The apparatus as recited in claim 13, where the mounting bracket includes slides that engage the platform rails.

15. The apparatus as recited in claim 8, wherein the platform is supported by length adjustable legs.

16. The apparatus as recited in claim 8, wherein the platform is supported on opposing sides of the platform by extendable slides.

17. A method of inspecting underground electrical manhole vaults and other structures, the method comprising the steps of:
obtaining an inspection apparatus, wherein the apparatus comprises:
a platform capable of centering over an access point to a structure, the platform including a central opening extending through the platform;
an extendable pole;
a mounting bracket coupled to the platform in alignment with the central opening, wherein the mounting bracket is adapted for coupling the extendable pole to the platform;
a camera having a camera mount that engages the camera to an end of the extendable pole, the camera further having a link to transmit and receive signals to and from a receiver positioned near the access point, and further wherein the camera mount includes servo motors such that the servo motors rotate the camera in at least one of a vertical, horizontal and circular orientation relative to a longitudinal axis of the extendable pole, and further wherein the servo motors are linked to the receiver to transmit and receive servo control signals to and from the receiver; and light emitting sources coupled to the extendable pole proximate the camera wherein the light emitting sources emit light to illuminate 360 degrees about the extendable pole;

mounting extendable slides to opposing sides of the platform;

centering the platform over the access point of the structure to be inspected;

positioning the extendable pole within the central opening of the platform and coupling the extendable rod to the mounting bracket;

engaging a height adjustment member to the extendable pole;

lowering the camera through the access point of the underground structure until the height adjustment member engages the mounting bracket;

providing electrical power to the camera and light emitting sources;

controlling the servo motors to adjust the camera orientation within the access point; and transmitting data between the camera and receiver.

18. The method as recited in claim 17, further including the step of attaching the extendable slides to a transport vehicle.

\* \* \* \* \*